(12) United States Patent
Hon

(10) Patent No.: US 8,935,334 B2
(45) Date of Patent: *Jan. 13, 2015

(54) SYSTEM AND METHOD TO CREATE A COLLABORATIVE WORKFLOW ENVIRONMENT

(71) Applicant: Simulat, Inc., Berkely, CA (US)

(72) Inventor: Henry Hon, Berkeley, CA (US)

(73) Assignee: Simulat, Inc., Berkeley, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 13/647,433

(22) Filed: Oct. 9, 2012

(65) Prior Publication Data

US 2013/0061155 A1 Mar. 7, 2013

Related U.S. Application Data

(63) Continuation of application No. 11/657,787, filed on Jan. 24, 2007, now Pat. No. 7,933,956.

(60) Provisional application No. 60/761,529, filed on Jan. 24, 2006.

(51) Int. Cl.
G06F 15/16 (2006.01)
G06F 17/30 (2006.01)

(52) U.S. Cl.
CPC .............................. *G06F 17/30058* (2013.01)

USPC .......................................... 709/205; 709/246

(58) Field of Classification Search
None
See application file for complete search history.

(56) References Cited

U.S. PATENT DOCUMENTS

| | | | |
|---|---|---|---|
| 6,204,840 B1 * | 3/2001 | Petelycky et al. | 715/202 |
| 6,636,889 B1 * | 10/2003 | Estrada et al. | 709/203 |
| 8,271,369 B2 * | 9/2012 | Gilmore | 705/36 R |
| 2002/0129106 A1 * | 9/2002 | Gutfreund | 709/205 |
| 2003/0014521 A1 * | 1/2003 | Elson et al. | 709/225 |

* cited by examiner

*Primary Examiner* — Mohamed Ibrahim
(74) *Attorney, Agent, or Firm* — Joseph R. Carvalko

(57) ABSTRACT

The present invention relates a method, computer system and a computer readable medium for creating a collaborative workflow process in a shared network space wherein the shared space is created by interaction of executable codes in a host and a user application and the shared space is described by a session attribute list; loading a media application with a plurality of tools into one or more user computers; inputting multi type content into the shared space; and displaying the content by computers in one of a synchronous or asynchronous mode; selecting a procedural framework template for the creation of a workflow process; and adding a content process section, a discussion point section, an approval section, a hand-off section; and storing state of the procedural framework.

20 Claims, 19 Drawing Sheets

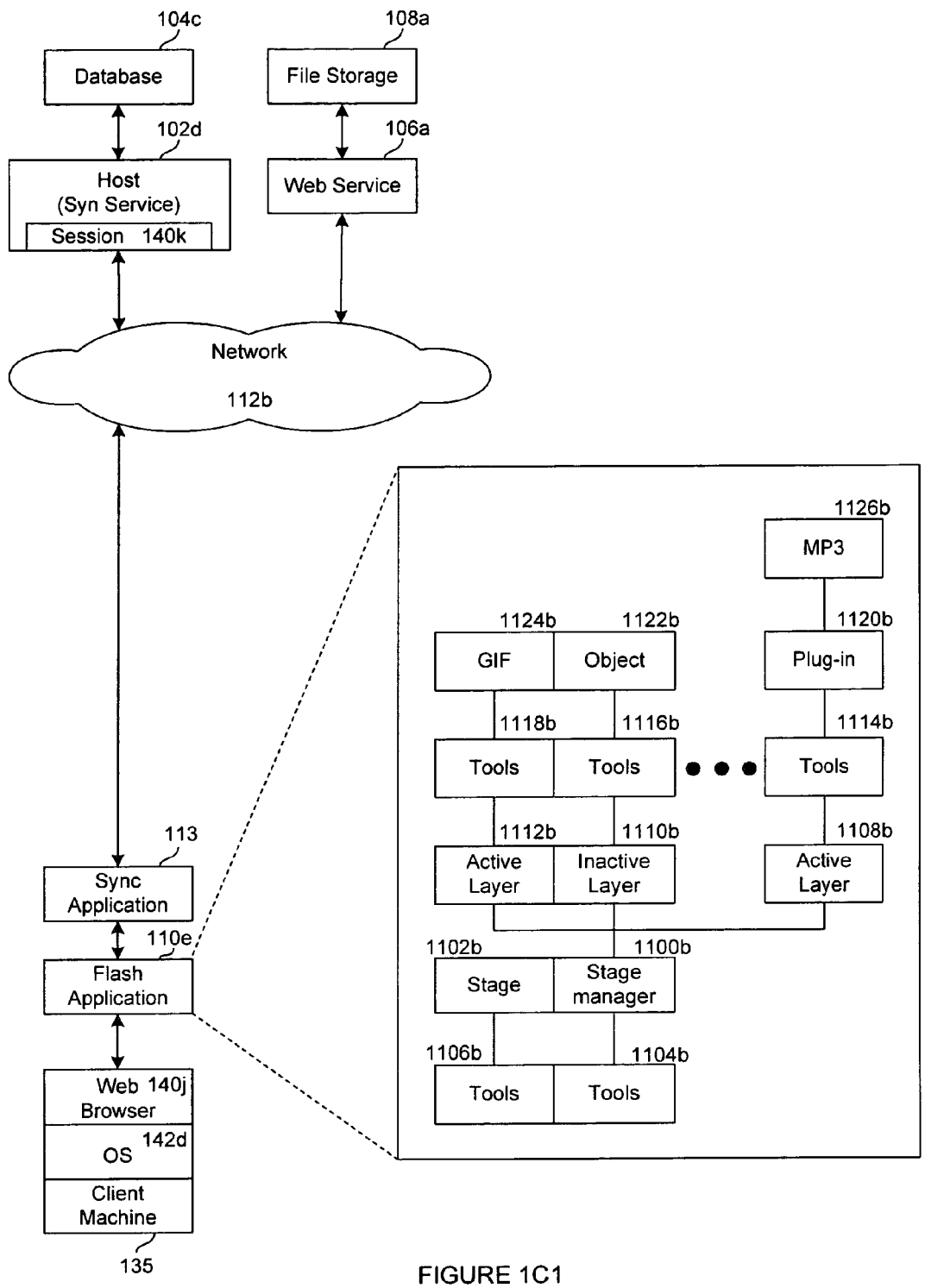
FIGURE 1C1

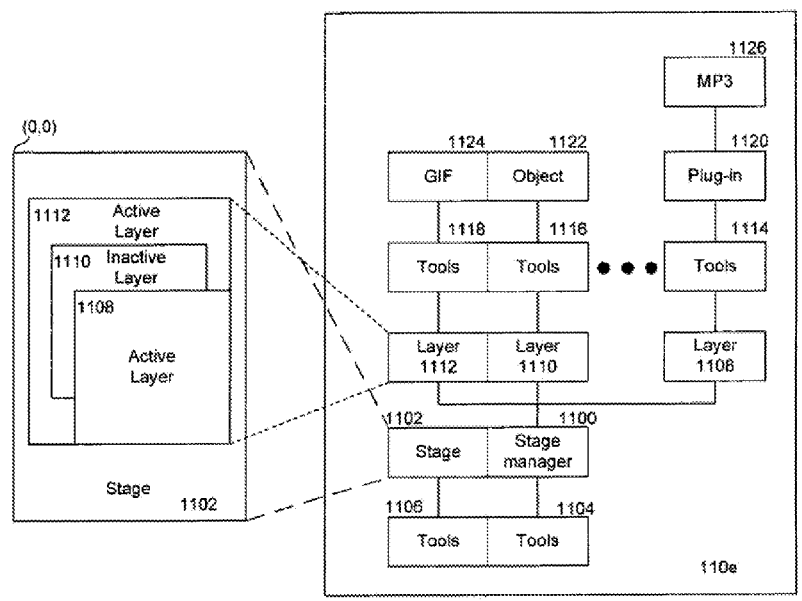
FIG 1C2

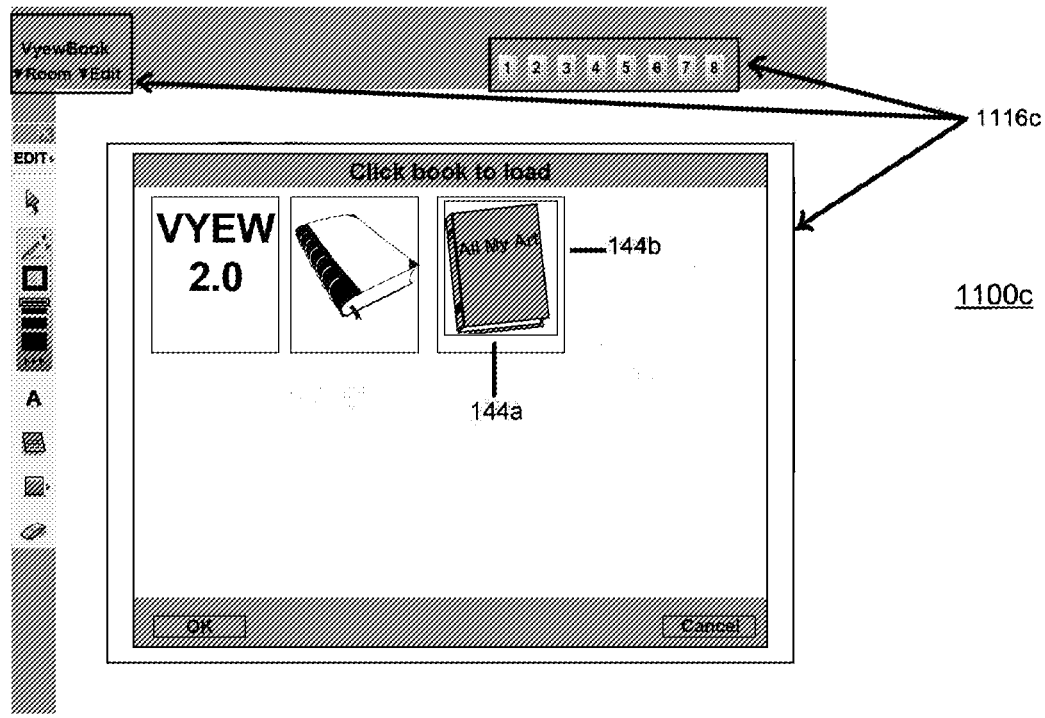
Fig 1F
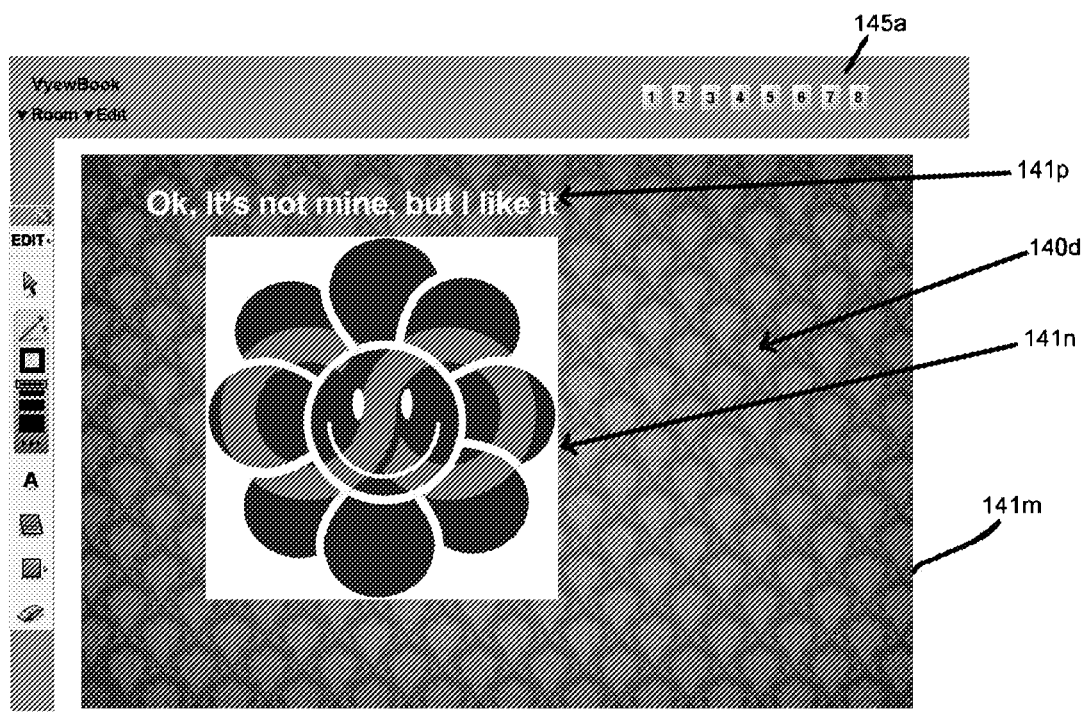
Fig 1F1

| | CONTENT | DISCUSSION | APPROVAL | HAND-OFF |
|---|---|---|---|---|
| 710 | Welcome letter: | ☐ | ☐ | To Henry |
| 711 | Brand Introduction | Difference between Seller A and Seller B ☐ ☐ | ☐ | |
| 712 | Product Catalogue | 1-Market Segment ☐ 2-Price Point ☐ | ☐ | |
| 713 | Price List | Pricing ☐ ☐ | Approved final price: customer, Seller A ☐ | Chief Buyer ☐ |

FIG 7 A

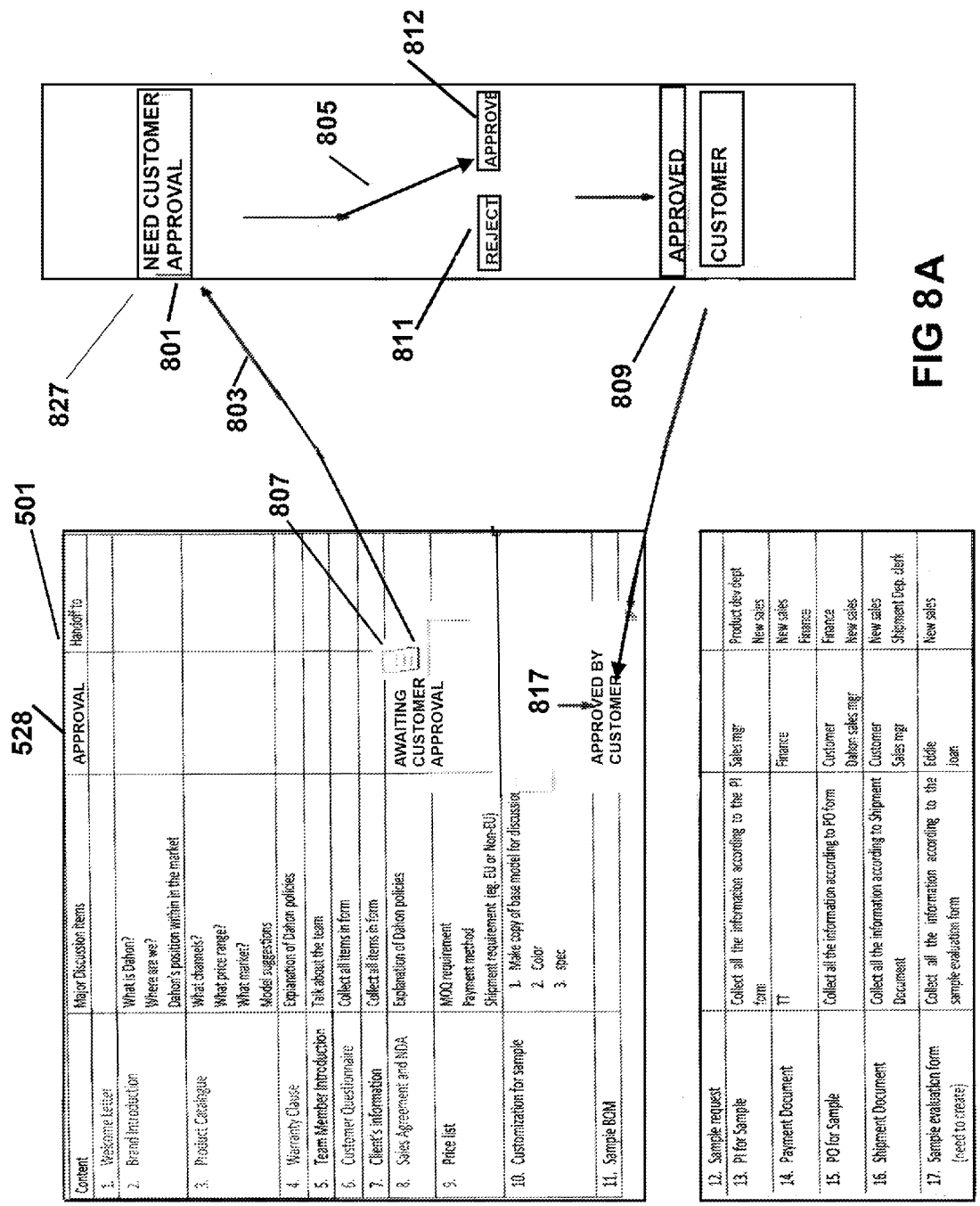

SYSTEM AND METHOD TO CREATE A COLLABORATIVE WORKFLOW ENVIRONMENT

CROSS-REFERENCE TO RELATED APPLICATIONS

This is a continuation-in-part of and claims the priority benefit under 35 U.S.C. 120 of U.S. Pat. No. 7,933,956 entitled A System and Method to Create a Collaborative Web-based Multimedia Layered Platform, filed Jan. 24, 2007; U.S. patent application Ser. No. 12/888,271 entitled System and Method to Create a Collaborative Web-based Multimedia Contextual Document filed May 30, 2012; U.S. patent application Ser. No. 12/319,807 entitled System and Method to Create a Collaborative Web-based Multimedia Contextual Dialogue filed on Jan. 13, 2009; U.S. patent application Ser. No. 12/378,805 filed Feb. 20, 2009 entitled System and Method to Create a Collaborative Web-based Multimedia Contextual Document, now abandoned; and additionally claims the benefit under 35 U.S.C. 119 (e) of U.S. Provisional Application No. 60/761,529, entitled A System and Method to Create a Collaborative Web-Based Multimedia Layered Platform, filed on Jan. 24, 2006, each of the entire disclosures of which are hereby incorporated by reference herein.

FIELD OF THE INVENTION

This invention generally relates to the field of asynchronous and synchronous web document production methods and systems.

BACKGROUND OF THE INVENTION

In the last few years, there has been an explosion in new forms of web based communication within a shared space. The synchronous form is most commonly practiced as Online Chat. With synchronous communication, like Online Chat for example, text is exchanged in real-time between participants. Although images can be provided to a limited extent, links to images or other multimedia is more commonly used. Another common form of synchronous communication is with web conferencing services. These services provide a discrete state synchronicity such that only one image can be shared at one time. Typically, once the session has ended, the images shared are lost. Many of the current online collaboration systems are beginning to record the sessions. However, these recording are only recoding a series of images for play back.

The most common asynchronous forms of collaboration are Forums, blogs and WIKIs. In the asynchronous case, visitors can upload text or images so that all subsequent visitors can browse and see the text or images. Blogs and forums have an advantage over Chat in that conversations can be linked into 'threads'. This allows the user to follow a set of contributions in a linear and/or nested fashion. Lacking is the real-time aspect as well as the ability to layer media. Currently even if you can upload an image or multimedia clip into a chat room or blog, visitors do no alter, manipulate or annotate over the original posting. What is common to these forms of shared communication is that they are linear. All information whether text or image, is accessed in order. A comment in a blog about an image does not appear on top of the image, but instead next to it as with 'threads'. The same holds true for a chat box. Users must cut and paste to refer to a past event.

Lacking is a system that will allow both synchronous and asynchronous communication using discrete media layers such that information can be organized by time and space which in turn can allow for a variety of organizational metaphors.

It will be desirable that multiple users are able to interact with one another and perform a plurality of multimedia tasks in a virtual and synchronized shared environment; or to be able to access and review the performed tasks from local or remote sources at will in any order. It will also be desirable to allow users to set control or restrict the viewing of media layers in the same shared environment through different filtering algorithms. It is also desirable that an original image can seem to be altered or manipulated by overlaying various media-layers together.

The following terminologies used in the application are selectively defined by online dictionaries such as Wikipedia to help understanding:

Account Owner (creator)—The person who owns, creates or maintains or provided stewardship over a particular session and all options, rights relevant to that session.

Annotation—Extra information associated with a particular point in a document or other piece of information.

API—An application programming interface (API) is the interface that a computer system or application provides in order to allow requests for service to be made of it by other computer programs, and/or to allow data to be exchanged between them Blog—A blog is a website in which journal entries are posted on a regular basis and displayed in reverse chronological order. The term blog is a shortened form for web log. Authoring a blog, maintaining a blog or adding an article to an existing blog is called "blogging". Individual articles on a blog are called "blog posts," "posts" or "entries". A person who posts these entries is called a "blogger". A blog comprises hypertext, images, and links (to other WebPages and to video, audio and other files). Blogs use a conversational documentation style. Often blogs focus on a particular "area of interest", such as Washington, D.C.'s political goings-on. Some blogs discuss personal experiences.

Collection—One or more media-layers that have an organizational structure. Typically this is stored as an XML file.

Converter—Programs for converting audio files, video, animations or applets of varying degrees of interactivity and function, presentations, documents, spreadsheets among other files in the original data format to another format that allows information to be accessible through a browser using a media application.

Common Web Browser—A web browser is a software application, technically a type of HTTP client, that enables a user to display and interact with HTML documents hosted by web servers or held in a file system. Popular browsers available for personal computers include Microsoft Internet Explorer®, Mozilla Firefox®, Opera®, Netscape®, Apple Safar®i and Konqueror®. A browser is the most commonly used kind of user agent. The largest networked collection of linked documents is known as the World Wide Web. It is assumed that all common web browser will have Macromedia Flash® installed or will support the installation and proper execution of Flash® applications.

Dynamic button—A clickable link that can jump the user to a different page in the same book, a different book, generate a new email in the users local email application, or send the user to a web page in a new browser window.

Event—A set of codes that describe the modification of a media-layer.

Images—defined as photographs, drawings (vector and raster), diagrams, etc.

Media-layer (media layer) (layer)—A media-layer is defined as a container that supports the display and modification of media and plug-ins. Media-layers have meta information, or attributes, such as; author, time/date created, its parent media-container, a list of children media-containers, position within 3D space, stacking order relative to the parent media-layer, size, reference to media or a plug-in that is assigned to the media-layer, etc Media (multi)—Multimedia is the use of several different media to convey information (text, audio, graphics, animation, video, and interactivity).

Medium—defined as the singular of multimedia. For example, text, a media, is a singular example of multimedia.

Network—A computer network is two or more computers connected together using a telecommunication system for the purpose of communicating and sharing resources. Examples include but are not limited to a WAN or LAN connection or an internet, intranet or extranet connection.

Online Chat—Online chat can refer to any kind of communication over the internet, but is primarily meant to refer to direct 1 on 1 chat or chat rooms, using tools such as instant messenger applications-computer programs, Internet Relay Chat, talkers and possibly MUDs, MUCKs, MUSHes and MOOes.

Plug-in—A plug-in is a computer program that can, or must, interact with another program to provide a certain, usually very specific, function. Typical examples are plug-in to display specific graphic formats (e.g., SVG if the browser doesn't support this format natively), to play multimedia files, to encrypt/decrypt email (e.g., PGP), or to filter images in graphic programs. The main program (a web browser or an email client, for example) provides a way for plug-in to register themselves with the program, and a protocol by which data is exchanged with plug-in. Plug-ins are slightly different from extensions, which modify or add to existing functionality. The main difference is that plug-in generally run within a sandbox, rely on the main program's user interface, and have a well-defined boundary to their possible set of actions.

Room—A Room is a common reference to a 'shared space'. A room contains default tools, rules and permissions that are set and controlled by the room administrator.

Space—A shared virtual reference point where as multiple users can interact in real-time upon shared objects.

Space Creator—The User creates an account to which a 'space' is allocated where other individuals also using a browser can engage in the synchronized or unsynchronized viewing and annotating of images.

Stage—A reference coordinate system that informs where media should be displayed. The most typical stage is a two dimensional Cartesian coordinate system where 0,0 is position in the upper right of the display area.

Session State—The state of all objects, GUI tools and controls, and media-layers, at any given time.

Sidebar panel—a window within a browser such as Windows® desktop (Windows is a registered trademark of Microsoft Corporation). Sidebars often perform various tasks, such as displaying the time and date and showing the CPU usage.

Threads—Threads in a forum are either flat (posts are listed in chronological order) or threaded (each post is made in reply to a parent post). Sometimes, community members have a choice on how to display threads.

Tools—GUI applications that affect the state of other tools and media-layers.

Tool: scene manager—specific GUI applications that affect the overall display of the stage.

Web based shared space—This describes a single point of reference for multiple users to access and add and modify information from a web browser for viewing by others via that same point of reference.

WIKI—A website that allows the visitors themselves to easily add, remove, and otherwise edit and change available content, and typically without the need for registration.

Whiteboard—a drawing utility, commonly supplied as part of a collaboration framework to allow distributed users to share a common drawing space.

SUMMARY OF THE INVENTION

The present invention relates to the field of collaborative computing in a shared network space, and more particularly to a computer method for managing a work flow collaborative file having a GUI including a display and a selection device for displaying a procedural framework, the method includes the steps of:

A. accessing one or more user computers in the shared space in the network, wherein the shared space is created by interaction of executable codes in a host and a user application and the shared space is described by a session attribute list;

B. loading a media application with a plurality of tools into one or more user computers;

C. using a stage manager tool from the media application to stage and correlate a plurality of media-layers according to spatial, temporal and relational coordinate data in the user application, wherein the media-layers data are described by at least one file descriptor inputting multi type content including one or more of text documents, graphic images, video images, audio or data files into the shared space;

D. providing one or more procedural framework templates to a workflow process with specific layouts;

E. providing plug-ins for each type content with in the workflow process;

F. selecting a procedural framework template for the creation of a workflow process;

G. adding one or more sections to the procedural framework template that include:
 (1) a content process section that includes at least one item of (a) steps to be performed or (b) content materials;
 (2) a discussion point section that optionally includes one or more of a topic of discussion item corresponding to one item of the content process section;
 (3) an approval section that optionally includes one or more of an approval item corresponding to one item of the content process section; and
 (4) a hand-off section that optionally includes one or more of a hand-off item corresponding to one item of the content process section;

H. storing state of the procedural framework by a user at any time during its use or in response to a user approved initiation signal, indicating that a section has been completed and/or each of limitations in items 1-4 sections above are completed.

The method herein also includes a second user performing one of the steps of approving or disapproving the completion of a section in the procedural framework and/or each of limitations in items 1-4 sections above are completed.

The present invention relates to the field of collaborative computing, and more particularly to a non-transitory computer readable medium having computer-executable instructions for creating a work flow collaborative file in a shared network space includes the steps of:

A. accessing one or more user computers in the shared space in the network, wherein the shared space is created by interaction of executable codes in a host and a user application and the shared space is described by a session attribute list;

B. loading a media application with a plurality of tools into one or more user computers;

C. using a stage manager tool from the media application to stage and correlate a plurality of media-layers according to spatial, temporal and relational coordinate data in the user application, wherein the media-layers data are described by at least one file descriptor inputting multi type content including one or more of text documents, graphic images, video images, audio or data files into the shared space;

D. providing one or more procedural framework templates to a workflow process with specific layouts;

E. providing plug-ins for each type content with in the workflow process;

F. selecting a procedural framework template for the creation of a workflow process;

G. adding one or more sections to the procedural framework template that include:
   (1) a content process section that includes at least one item of (a) steps to be performed or (b) content materials;
   (2) a discussion point section that optionally includes one or more of a topic of discussion item corresponding to one item of the content process section;
   (3) an approval section that optionally includes one or more of an approval item corresponding to one item of the content process section; and
   (4) a hand-off section that optionally includes one or more of a hand-off item corresponding to one item of the content process section;

H. storing state of the procedural framework by a user at any time during its use or in response to a user approved initiation signal, indicating that a section has been completed and/or each of limitations in items 1-4 sections above are completed.

The invention also relates to a method wherein the media application is by way of example and not limitation a Flash application, Java application or browser based scripts.

The invention also relates to a method of a user moving pages in the workflow between one or more rooms and to/from a website on the World Wide Web.

The invention also relates to a method of using a template to permit content creators to decide where to place the content within a workflow; using the template to dynamically swap in and out pages within the room as dictated by the use to which the workflow are put; and using the template to permit the use of one or more of dynamic buttons and plug-in features such that users of the workflow template may access tables of content that reside within one or more libraries having tables of content.

The invention further relates to methods for publishing the room, storing the procedural framework in a library for publication, embedding the procedural framework into in any web property, embedding into the procedural framework as an autonomous software agent to trigger one of the creation, duplication and/or publication of copies of procedural framework and filtering, viewing permission, copying and publication.

A computer system for creating a work flow collaborative procedural framework in a shared space within a network includes: a host server that communicates to a database and a file storage through a network; a user machine with a user application that logs to the host server to join a shared space session with other user machines running user applications, wherein the shared space session is generated by interaction of executable codes in the host and the user application and the shared space session is described by a session attribute list;

a first memory for storing application code with a plurality of tools into one or more user computers;

an input device for inputting multi type content including one or more of text documents, graphic images, video images, audio or data files into the shared space; a stage manager tool from the media application to stage and correlate a plurality of media-layers according to spatial, temporal and relational coordinate data in the user application, wherein the media-layers data are described by a file descriptor inputting multi type content including one or more of text documents, graphic images, video images or data files into the shared space;

and a display for displaying the content by computers in the shared space in one of a synchronous or asynchronous mode;

a second memory for storing (a) collaborative procedural framework templates to create pages with specific layouts, (b) plug-ins for each type content for searching additional resource information, (c) converters for accessing through a browser the content of the procedural frameworks each such procedural framework including:
   (1) a content process section that includes at least one item of (a) steps to be performed or (b) content materials;
   (2) a discussion point section that optionally includes one or more of a topic of discussion item corresponding to one item of the content process section;
   (3) an approval section that optionally includes one or more of an approval item corresponding to one item of the content process section; and
   (4) a hand-off section that optionally includes one or more of a hand-off item corresponding to one item of the content process section;

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts, and wherein:

FIG. 1C1 is an embodiment of a system illustrating the process of establishing and operating a session within a user application such as a web browser using various tools in an application in accordance with an embodiment of the invention;

FIG. 1C2 illustrates another embodiment of various components of a Flash application tools interacting with the user's media-layers during a session in accordance with an embodiment of the invention;

FIGS. 1F and 1F1 illustrate the construct and functionality using media-layers and metaphor specific tools in accordance with an embodiment of the invention;

FIG. 7A depicts a browser having therein a collaborative working procedural framework in accordance with an embodiment of the invention;

FIG. 8A depicts a browser having therein a collaborative working procedural framework in accordance with an embodiment of the invention;

DETAILED DESCRIPTION OF THE PREFERRED EMBODIMENTS

Figure 1A:
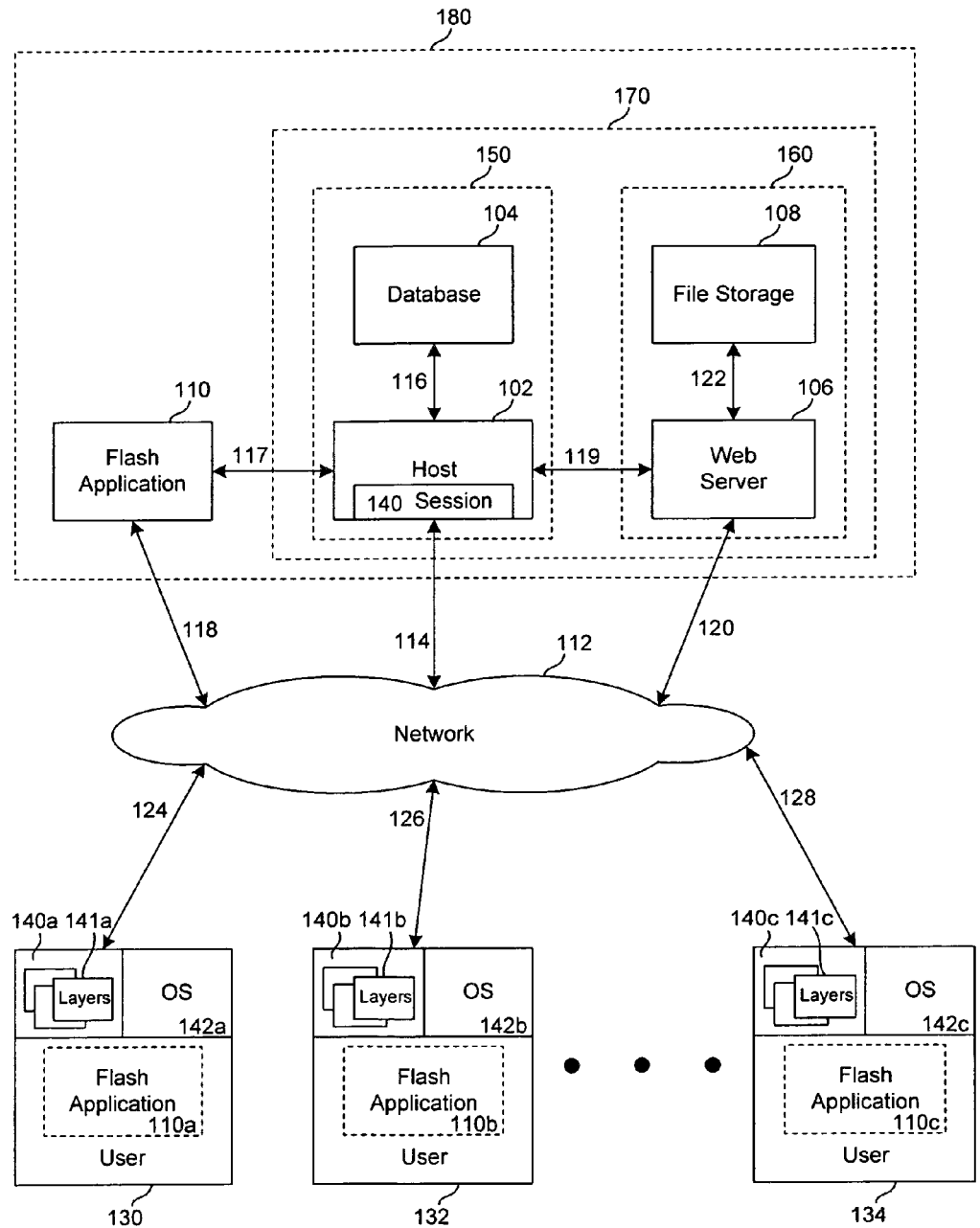
FIG. 1A depicts the embodiments of a system to create a session in shared spaces for the collaborative web-based media-layered platform in a network environment in accordance with an embodiment of the invention.

The following description includes the best mode of carrying out the invention. The detailed description is made for the purpose of illustrating the general principles of the invention and should not be taken in a limiting sense. The scope of the invention is determined by reference to the claims. Each part is assigned, even if structurally identical to another part, a unique reference number wherever that part is shown in the drawing figures.

The present invention, relates to the field of collaborative computing, and more particularly, to a system and method for providing a browser-based program to create, and configure a shared space whereby multiple users can access this shared space to perform tasks and interact such as input, modify text and delete images, drawings and other multimedia via media-layers in a real-time synchronous manner. A shared space is defined as a virtual reference point whereas multiple users can interact in real-time upon shared objects. It is a conceptual construct created by processing executable computer codes from a plurality of programs or plug-ins typically using Flash Virtual Machine (VM) or Java VM. A session is defined as the state of all objects, GUI tools and controls, and media-layers, at any given time within the shared space. Each media-layer can serve as a container for shapes and objects as well as other programs such as a text editor, thumbnail viewer, MP3 player, games, etc. The invention also allows which media-layer(s) to display via organization metaphors and filtering criteria. The invention also allows for offline or unsynchronized interaction with objects of a session. Offline events are recorded for later integration with the session.

FIG. 1A of the present invention relates to a distributed web based conferencing system, apparatus and method, which includes at least one central processing computer or computer network server. FIG. 1A depicts the basic foundation of the invention of system 100A to create a session 140 in shared spaces 140a to 140c for multiple users to collaborate on a web-based platform with created media-layers 141a to 141c within a network 112 environment. The system 100A is derived from four main components. Client or user computer(s) 130 to 134, host server 170, database 104 storage device, file storage 108 which is accessible through a web server 106. Each component may be on the same computer or separate computers. It is not necessary that each computer is of the same OS, nor CPU, type. Servers 150, 160 include at least one controller (not shown) or central processing unit (CPU or processor), at least one communication port or hub, at least one random access memory (RAM), at least one read-only memory (ROM) and one or more databases such as database 104 or data storage devices 108. All of these later elements are in communication with respective CPUs to facilitate the operation of the host server 170. The server 170 may be configured in many different ways. For example, host server may be a conventional standalone server computer or alternatively, the function of server may be distributed across multiple computing systems and architectures.

Server 170 also may be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers such as web server 106, or user computers (e.g., 130, 132, 134) and other related devices. The communications hub or port may have minimal processing capability itself, serving primarily as a communications router establishing a corresponding link 119 with the web server 106. A variety of communications protocols may be part of the system, including but not limited to: Ethernet, SAP, SAS™, ATP, Bluetooth, GSM and TCP/IP.

Data storage devices such as file storage 108 may include a hard magnetic disk drive, optical storage units, CD-ROM drives, or flash memory. Data storage devices contain databases such as database 104 used in processing transactions and/or calculations in accordance with the present invention, including at least a user subscriber database and a user content database. In one embodiment, database software creates and manages these databases. Conference related calculations and/or algorithms of the present invention are stored in storage device and executed by the corresponding CPU.

The controller comprises a processor, such as one or more conventional microprocessors and one or more supplementary co-processors such as math co-processors. The processor is in communication with a communication port through which the processor communicates with other devices such as other servers, user terminals or devices. The communication port may include multiple communication channels for simultaneous communication with, for example, other processors, servers or client terminals. As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor also is in communication with a data storage device. The data storage device may comprise an appropriate combination of magnetic, optical and/or semiconductor memory, and may include, for example, RAM, ROM, flash drive, an optical disc such as a compact disc and/or a hard disk or drive. The processor and the data storage device each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing.

The data storage device may store, for example, (i) a program (e.g., computer program code and/or a computer program product) adapted to direct the processor in accordance with the present invention, and particularly in accordance with the processes described in detail hereinafter; (ii) a database adapted to store information that may be utilized to store information required by the program. The database includes multiple records, each record including fields specific to the present invention such as membership rates, subscribers, sessions, etc.

The program may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as alternative steps of invention. The computer program code required to implement the above functions (and the other functions described herein) can be developed by a person of ordinary skill in the art, and is not described in detail herein.

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Server 170 of the present invention may also interact and/or control one or more user devices or terminals (e.g., 130, 132, 134). The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc.).

The shared spaces 140*a* to 140*c* emulate and share the contents of the session 140 where executable computer codes in both the client or user computers 130 to 134 and the host 102. The executable codes in each computer may be different, but the intended results of the invention are achieved. The state of the session 140 is maintained on the host 102 during a live session 140 then the database 104 at the end of a session. All client or user computers 130 to 134 that are logged into a session 140 are constantly updated with changes to the session 140 in real time. If permissions are granted, any client can initiate a change to the state of the live session. Once this change has been sent, all client computers 130 to 134 are updated with the change.

The system 100A comprises of a host 102 in synchronous communication with one or more user computers 130 to 134. In an embodiment, the host is a server in communication with a database 104; where the host is also in communication with a web server 106 that communicates with a file storage 108. The database 104 can be in a separate server, or can be part of the host 102 within the same server 150. Similarly, the web server 106 and the file storage 108 can be separate units or can be integrated into a server 160. Yet in another embodiment, a host 170 is a server including the functions of the database 104, the web server 106 and the file storage 108. The physical location of the database 104, file storage 108 and the method of writing the computer executable codes being integrated into the host server 102 is not important to the invention as long as the functions are accessible to the host 102 and to the user computers 130 to 134.

In an embodiment, each of the user computers 130 to 134 has an operating system 142a to 142c such as the Microsoft Windows XP®, Linux®, Macintosh OSX® or any third party operating system. The operating system in each of the user computers 130 to 134 need not be the same as long as it supports a web browser or other application to access the internet and supports the execution of codes to facilitate the intended media functions of the invention. In another embodiment, compiled Flash VM executable codes of the application 110 are downloaded before the creation of a shared space 140a to 140c to each of the user computers 130 to 134 from the host session 140 through the network 112 and links 124 to 128. Yet in another embodiment, the application 110 can be native to each of the user computers 130 to 134 as media applications 110a to 110c.

One or more media layers 141a to 141c are created and respective media tools are from media applications 110a to 110c is generated by the interaction of the codes in the user computers 130 to 134 and the codes from the host server 180. The network 112 and the corresponding links 114, 118, 120 to 128 are part of the Wide Area Networks (WAN), Local Area Network (LAN) through Ethernet connections or wireless connections. Yet in other embodiments, the network and the links can be Local Optical Networks (LON) or direct fiber optic links or direct terminal connections or plain old telephone service (POTS). In all forms of link communications within the network 112, the communications can be enhanced with known encryption protocols to improve security.

All services as contained within the host server 180 are equipment selected from the list to include a server, work station, personal computer, laptop computer, Personal Digital Assistant (PDA), an Intelligent Electronic Device (IED) or any suitable computing platform with sufficient memory and processing power to perform the functions as a server in a network environment. The user computers 130 to 134 are equipment selected from the list to include a server, work station, terminal, personal computer, lap top computer, Personal Digital Assistant (PDA), electronic tablet, handheld wireless device, a cellular phone, an Intelligent Electronic Device (IED) or any suitable computing platform with sufficient memory and processing power to perform the functions as a user computer to perform media inputs in a network environment.

Yet in others embodiments, the system 100A can be extended to include broad applications such as web conferencing, local conference presentations projecting synchronized annotations or pointing tool to contents on multiple screens to mass audience, on line interactive courses and tutoring, live interactive interviews to multiple interviewees in different geographical locations, interactive debate forums using multimedia, interactive cellular phone chats and games, secured synchronized interactive voting method combined with secured voter identification, live military battlefield operational command, remote interactive clinical instructions and operation training procedure; and electric power utility interactive service, support and trouble shooting etc. Said examples and the contents desired for the execution of said example can be assembled before and during synchronized events. Content can also be made available in an unsynchronized fashion such that independent content review or read only publishing can be supported.

Figure 1B:
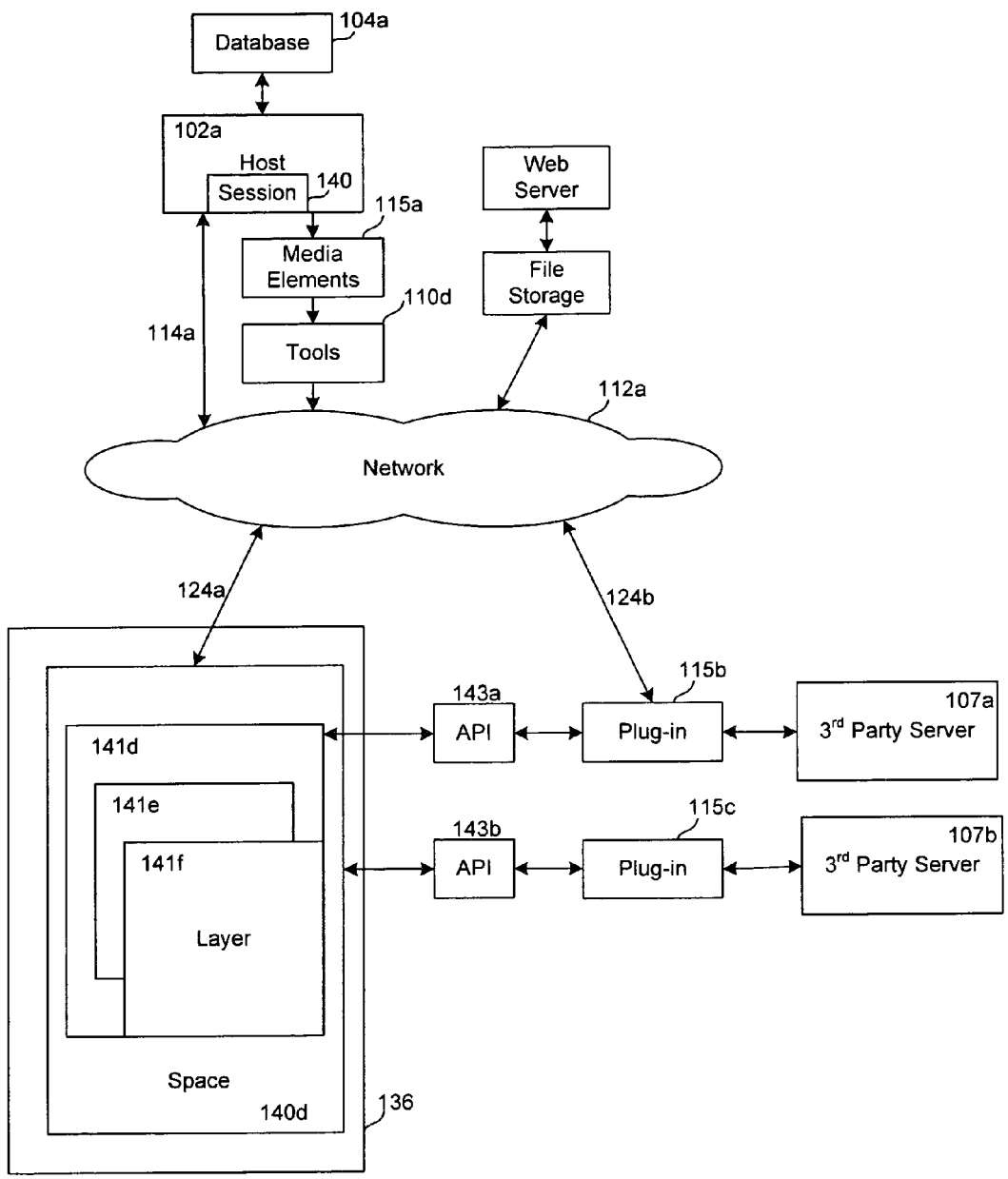
FIG. 1B illustrates the system initiation to create a session of collaboration in media-layers in accordance with an embodiment of the invention.

FIG. 1B illustrates the system 100B initiation to create a session 140 of collaboration in media-layered 141d to 141f within space 140d that holds media elements 115a, tools 110d (Flash application tools) or plug-ins 115b and 115c. Plug-ins 115b and 115c are independent applications that must conform to the system's API 143a, 143b as well as be compatible with the system's runtime environment. For example, if the client system is a macromedia Flash application, then the plug-in 115b and 115c must also be a Flash application. Said plug-ins 115b and 115c can be accessible either locally from the client computer 136, or through a local connection, or a network 112a. A plug-in 115b or 115c can, however, manage the execution of the tools of an application not of the same executable code base as the client application. For example, a Flash plug-in 115b or 115c can manage the execution of the Java application as relevant to the client computer 136.

In an embodiment, the initialization of the system 100B (in the synchronized state) requires that the user's or client's computer 136 has internet access through link 124a to network 112a and the ability to support compiled Flash based applications. A typical configuration will involve the use of a common web browser with a flash plug-in and JavaScript enabled. Through the use of a URL, the user or client makes a request to join a session 140 by sending login credentials to the host 102a. The host 102a in turn will query the database 104a to determine the tools 110d that must be downloaded and the current session 140 state parameters. In addition, plug-ins 115b and 115c are sometimes downloaded from third party servers 107a and 107b. Instruction and location of said plug-ins 115b and 115c are provided by the host 102a.

The host 102a first sends a base application that provides a synchronizing connection between that user 136 and the host 102a. A standard socket connection is established. Should this fail, High Ports are tested for the ability to exchange data. Should this fail, ports 80 and 81 are checked via standard HTTP protocols. Once a connection by links 114a and 124a from the user 136 to the host 102a has been established, the host 102a will send a list of required application tools 110d to be loaded by the user computer 136. By only loading those tools 110d that are required, the system in the user's computer 136 will start faster with a lower memory requirement. Should the user choose to run in 'thin' mode, those tools 110d that are only needed on demand will be loaded into memory during their use and unloaded after their use is no longer required.

FIG. 1C1 is an embodiment of a system 100C illustrating the process of establishing and operating a session within a user application such as a web browser 140j using various tools in Flash application 110e. When a user 135 logs onto the system 100C via the internet, LAN or WAN 112b, the user 135 is registered in a shared virtual environment (session 140k) based on user's credentials and other parameters supplied at log on. In this exemplary example, the flash application 110e is loaded on to the client's computer 135 by the client's web browser 140j. This flash application 110e in turn, loads a communication synchronizer application 113 that contacts the Host's server synchronization service 102d and requests to be registered with a particular shared space for a session. Once this connection has been established, all communication between the client application 110e and the host sync service 102d happen between these two applications.

Based on user credentials and other parameters supplied, a list of tools and their location(s) on the file storage server(s) 108a is generated. This list is passed to the flash application 110e. The flash application 110e then loads a stage manager tool 1100b into the buffer memory from the web server 106a. This tool 1100b creates and manages the stage 1102b. Once this is done, the flash application 110e then sends a message back to the file storage server 108a via sync application 113.

One of the tools that are loaded is the stage manager 1100b. This tool 1100b, once loaded, looks at the attribute list of the current room for the session. One item on that list is the type of layout to be used on the stage. If any other layout is defined besides 'default', additional tools 1104b are downloaded to support the additional features. The stage manager 1100b is then provided a list of media-layers 1108b to 1112b. Those media-layers that are listed as 'active' should be currently displayed. Active media-layers 1108b and 1112b are accessed, loaded and displayed on the stage 1102b. Once complete, non-active media-layer(s) 1110b are downloaded and stored in cache memory in a prescribed order if this option was selected. All of the media-layers together, both loaded and unloaded, 1108b to 1112b are called a 'collection'. The relationship of all media-layers 1108b to 1112b to each other can be stored in an XML file known as the 'collection'. The most exemplary example is the default stage manager system where all media-layers are displayed using the Cartesian coordinate system where the y axis is inverted. An example XML collection file follows: TABLE-US-00001 . . . <collection type='book_simple' label='my book' authorID='23jkl4johnsmith' . . . > <tools> <page_navigator pluginRef="./plugins/book_nav.swf"/> <page_thumbnail_viewer pluginRef=" . . . /plugins/thumb_view.swf"/> . . . <tools/> <layer ID='a' label='title page' parent='top' z=0 . . . ><children 0='b'/> . . . <layer/> <layer ID='b' label='title page' parent='a' z=1 . . . > < . . . . . . .

The stage manager tool 1100b then checks to see what type of collection has been loaded. In this case, it is a 'book_simple' type collection. The tools 1104b required for this type of layout is listed in the 'tools' section of the XML. The client flash application 110e then downloads into memory those tools 1104b listed.

FIG. 1C2 illustrates another embodiment of various components of the Flash application 110e interacting with the user's media-layers 1108 to 1112 on the stage 140f. Although there are a number of possible combinations of tools that can be loaded, the one tool that is always loaded is the stage manager 1100. The stage manager tool 1100, among other things, established the coordinate system and layout format that will be populated by media-layers 1108 to 1112. The most typical configuration of the stage 1102 is a two dimensional cardinal system where 0,0 is located on the upper left most side of the application window placed just under the displays for session and user information and controls. These controls are typically displayed at the top of the application window. The list of active media-layers 1108, 1112 are passed to the stage manager 1100. The media-layers 1108 and 1112 that are tagged as 'visible' are loaded first and then displayed in a stage 1102.

A media-layer is a container that serves as a reference point for media as well as other media-layers. Since media-layers 1108,1110 can be attached to another media-layer 1112, nesting of media-layers can occur. For example, a 'parent' media-layer 1112 contains an image of a human face on it. A 'child' media-layer 1110 is nested on top with a mustache drawn over the face, and another 'child' media-layer 1108 is nested on top with eye glasses drawn. When the parent media-layer's 1112 object is moved or hidden, the two child media-layer's 1110 1108 objects will also move or be hidden, thus maintaining their visual relationship. Each child however can have its visibility setting changed by a parent or another media-layer in the patriarchy. A media-layer from outside the patriarchy cannot modify a media-layer unless such functionality is support by the system's API.

Figure 1D:
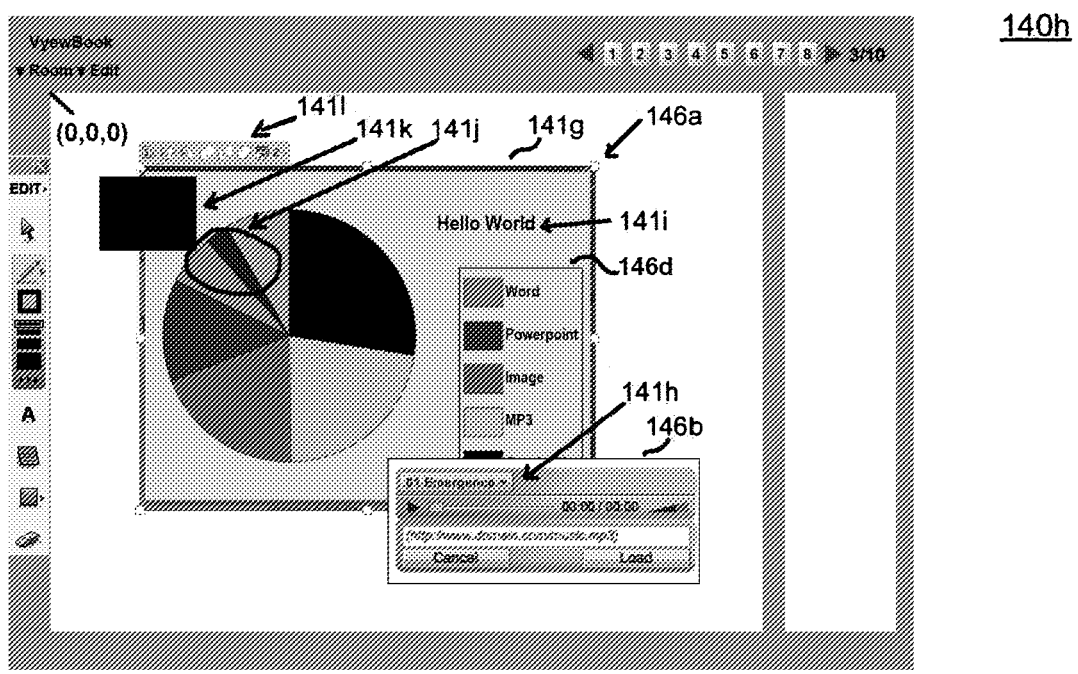
FIG. 1D is a screen shot illustrating the construct of a page as a collection of media-layers in accordance with an embodiment of the invention.

A screen shot is taken from the product Vyew® in FIG. 1D to illustrate the construct of a page 140h. In FIG. 1D, page 140h is a collection of media-layers 141g to 141l. A media-layer such as 141h is a container to execute the codes of an application or a plug-in. For example, media-layer 141h contains a plug-in 146d where a plurality of media object elements can be executed, such as 146b to execute an mp3 music player in the media-layer 141h. Another example, media-layer 141g is a gif image, which is currently selected. It has the ability to render bitmaps and vector information (images or animations) directly to the display. Media-layers can also display other compliant applications. The scale and position of a media layer 141g can be modified by using tool 146a which is part of toolset 141l within the page 140h. Each of the media layers 141g to 141l is referenced to a space coordinate origin of (0,0,0) at the upper left corner of the page 140h. The attributes of the media-layers 141g to 141l are referenced in a collection file descriptor such as in a XML file.

Figure 1E:
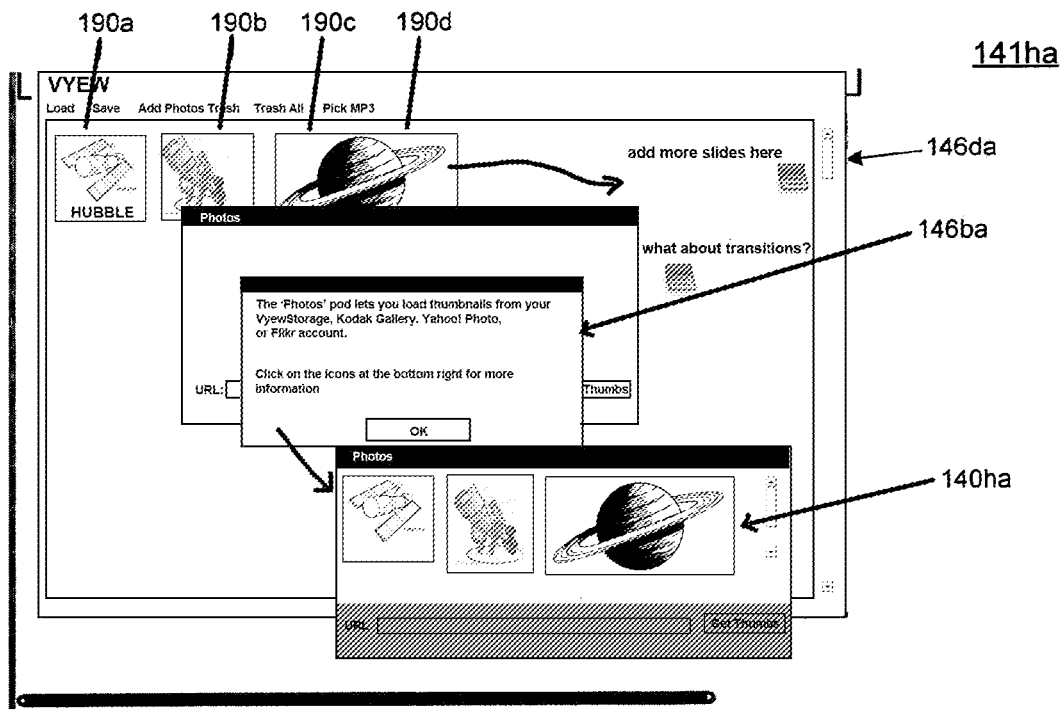
FIG. 1E illustrates an example of a media-layer as a container for an application or plug-in to create media object elements within the media-layer in accordance with an embodiment of the invention.

FIG. 1E further illustrates another example of a media-layer 141ha as a container to a media application or thumbnail viewer plug-in 146da creating a plurality of media object elements within a media-layer 141ha. For example the thumbnail viewer plug-in 146da is referenced on a media-layer. Once this plug-in 146da had been initialized, a popup tool 146ba will assist the user in configuring the plug-in 146da. In this example; how to access images 190a to 190d that are stored on a third party server. The user selects a set of images from the third party server 140ha. Those images 190a to 190d are then place in new media-layer(s) or a reference of these images 190a to 190d are passed to the thumbnail viewer 146d via the systems API set shown in FIG. 1B.

FIGS. 1F and 1F1 illustrate the construct of a Book metaphor using media-layers created and managed by tools 1116c. After the stage manager 1100c invokes the book metaphor toolset 1116c, a media-layer 144a labeled as 'cover' 144a of a book image 144b is loaded into a tool 116c that supports the book metaphor.

Another media-layer 141m could then be created as a page. The media layer of the page 141m holds object elements such as a graphic of paper texture 140d. This media-layer of page 141m would be set as a child to the media-layer of the book 144a as well as have the attribute of 'page=2' 145a. A third media-layer 141n would contain an image and this media-layer 141n will have a Z value of "1" placing it over the page 141m media-layer and then set as a child to this page 141m media-layer. Other media-layers 141p with annotation and media can be added as children to either the page 141m media-layer or one of the media-layers 141n that has been already set as a child to the page 141m media-layer. When the book 144a media-layer is displayed on the stage (not shown), the other children media-layers 141m to 141p would be hidden. When the user 'opens' the book 144a, the cover 144b media-layer would hide and the page 141m media-layer with its children and subsequent generations 141n, 1441p would appear. Because we are employing a book metaphor 144a, tools 1116c of FIG. 1F would be provided to the user that would assist in the visibility, ordering and the setting of relationships between media-layers 144a, 144b, 141m to 141p. The user would not know about child or parent or media-layers, only that they created a book 144a, and that they can add pages, and then add content to those pages. In another example, other metaphors not shown could be one of a 2.5D environment where media-layers are expressed as 2D planes intermixed with 2.5D objects. A set of such as six media-layers can be set as children to a parent media-layer thus creating a cube for the 2.5D environment. These metaphors are supported with graphics that support the navigation and ordering of the multimedia elements that appear on each media-layer. Since all media is displayed using media-layers and all media-layers can have their visibility, stacking order, position, relationships, etc. modified; then various tools and GUI (Graphical User Interface) elements in the menu tool bars can be created to managed these attributes in a more user friendly method. Typically, metaphors that humans are familiar with are used.

The issue of concurrent users in making an annotation to the media layer is addressed next. Unique to this invention is that ability to share in real-time, near real-time as well as maintaining persistence, the ability to create, modify and delete media-layers and the media elements associated with those media-layers and regulate access to those media-layers. In addition, all tools and User Interface (UI) elements can be controlled at runtime based on commands from the stage manager. As such, not all users logged into a shared space will see that same thing if such modifications are selected. For example, the administrator of the shared space may wish to have all the tools made available to him or her. However, all other users who are of type 'guest' will not see any tools. Those users who are of type="invited" may see only a subset of tools that the administrator sees.

When a user is logged into the system, actions that are performed on the media or changes to the media-layer's attributes are tracked and sent to the server. The server maintains a log of the actions and the resulting status of media-layers and their media. The server then repeats the actions to all users who are logged into the same session. When users enter in to a session, they immediately load all active media-layers, media and plug-ins. In this way, every user who is logged into the system has a copy of the media elements and only has to execute the actions that were sent by the server. Since all users can (if allowed by the administrator) have their action communicated back to the server, everyone's actions within the space is reflected on the display of all concurrent users. If the administer allows more then one user access to a media-layer, then only one action may occur at one time within a media-layer. In other words, if a user initiates an action, no other actions can take place until the first action is complete. Concurrent actions can occur on separate media-layers. The administrator can select that all actions on media-layers are NOT locked. This means that if two users click on the same media-layers media, then whomever's event is sent last, will have said event respected unless the object is deleted or somehow unable to execute the later event.

A whiteboard tool performs the unique function of creating a new media-layer every time a line is started and then stopped. Each line and/or shape in the whiteboard tool library is treated like an individual object on its own media-layer.

For whatever metaphor employed, the information required to create and support an ordering construct is managed by the stage manager. All rights to what media-layers and tools are loaded, seen and how they function is controlled by the user or administrator who created the space (account). The administrator can pass the rights of a media-layers and tools to anyone(s) or to everyone.

Figure 1G:
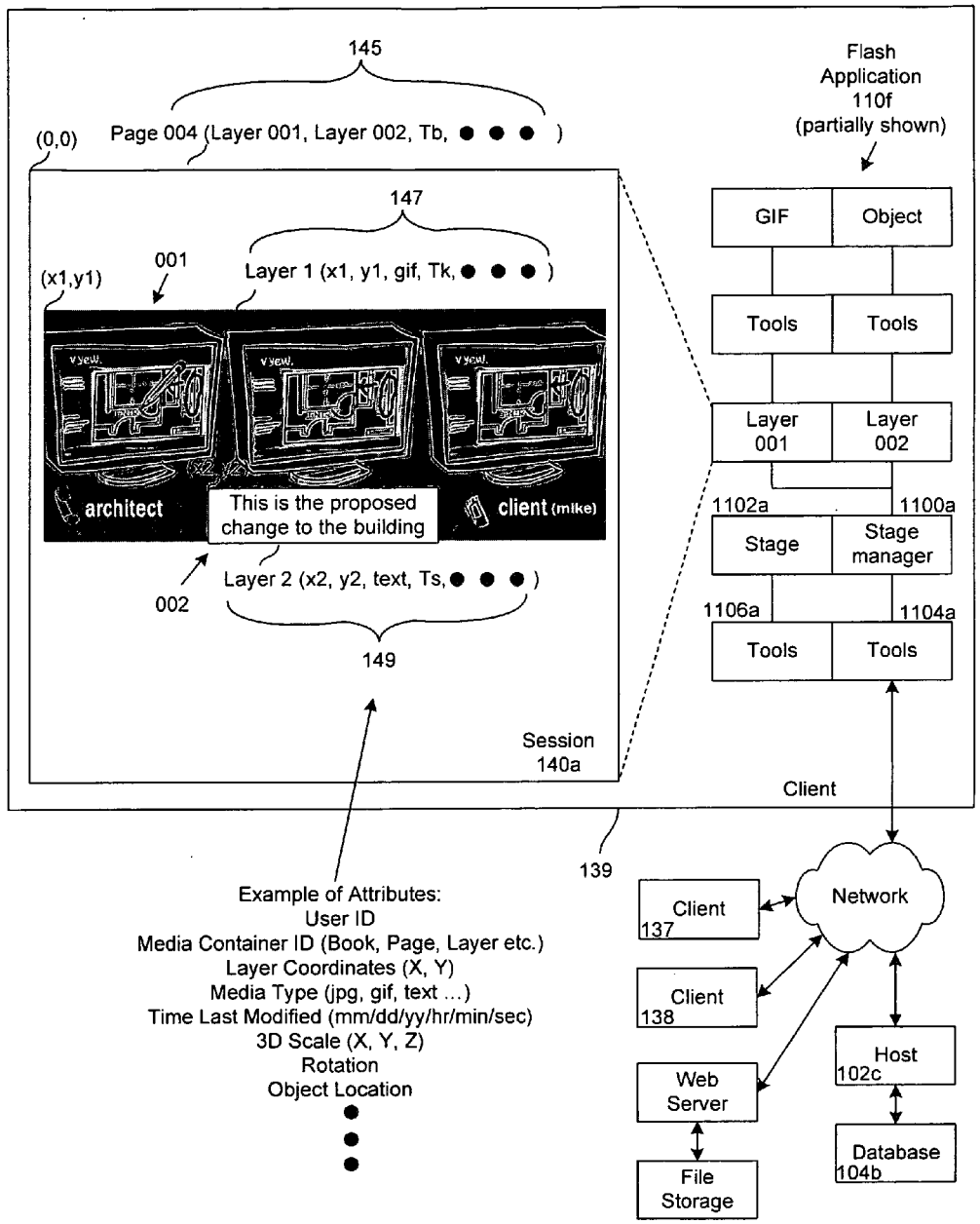
FIG. 1G illustrates an example of staging and synchronizing media-layers using a Flash application tool for the construct of a page as a collection of media-layers in accordance with an embodiment of the invention.

FIG. 1G illustrates an example of staging and synchronizing media layers using a Flash application tool for the construct of a page 004 as a collection of media-layers 001 and 002. Each media-layer 001 or 002 has attached to it, a set of corresponding attributes 147 or 149 that inform the stage manager 1100a also shown as 1100b in FIG. 1C1 on how to manage a respective media-layer. For example, media-layers with the media-layer ID 001 and 002 respectively have been placed on the stage 1102a of a Flash application 110f to be displayed. Media-layer 001 may have the following attributes: Layer ID (001), Position X1 (30), Position Y1 (30), Position Z (0), Scale in X (100), Scale in Y (100), Scale in Z (100), Rotation (0), location of media object ( . . . //arch_exmpl.jpg), type of media object (image), Date Created (some date), Date last modified (some date), Date deleted (some date), ID of the user that created this layer (jones43), etc. From this information, the stage manager will know to load a jpg image from a given location and display that image, unaltered 30 units to the right and 30 units down. Media-layer 002 may have the similar attributes with Position X as (40), Position Y (40) and Position Z (1). In this case, the text field would appear within the application with the image in media-layer 001 under the text of media-layer 002. If another user with a client computer 137 or 138 accesses this same session, then the same steps will repeat, thus assuring that both client computers 137 and 138 are displaying the same thing.

Interacting with media objects in a synchronized mode is discussed next. The stage manager tool 1104a of the system 110b insures that all changes in state of a media-layer or actions that are passed to the media-layer from that media-layer's contents, is communicated to the host server 102c to either be recorded, or sent to some or all of the other client computers 137 and 138. This is accomplished by the host server 102c maintaining a list of all subscribed client computers 137 to 139. As an event is received from a client computer 139, that event is logged and stored either on the host server 102c and/or on the database 104b. This event is then passed to the rest of the client computers 137, 138 on the subscriber list. The event is then replicated on all client computers 137, 138, however, in rare cases, an exception rule can intercept the event and then follow a defined action which may or may not mimic the original event. For example, a client computer 137 may click on an object in a media-layer 002 thus making that object interactive. The client 137 then moves the object 002 from one location to another, thus creating an event. The changed media-layer attribute 149 information, in this case Position X, Position Y, date last modified, to the host server 102c as an event. The host server 102c records this new information and then sends this event information to all subscribed client computers 137 to 139. Users on the client computers 137 to 139 would then see the same object from the original location to the new location as indicated by the terms of the event.

Figure 2A:
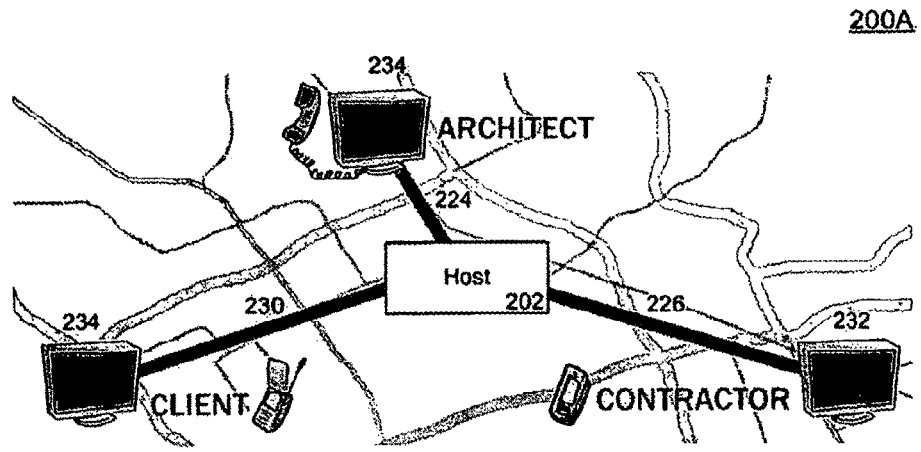
FIG. 2A illustrates an example of collaborative actions in a web conferencing environment in accordance with an embodiment of the invention.

FIG. 2A illustrates an example of collaborative actions in a web conferencing environment 200A. Users 230 Client, 232 Contractor and 234 Architect hold a teleconference in separate geographical locations. A virtual shared space is created when users 230 to 234 are logged into a common session through synchronous communication links 224 to 228 with host server 202.

Figure 2B:
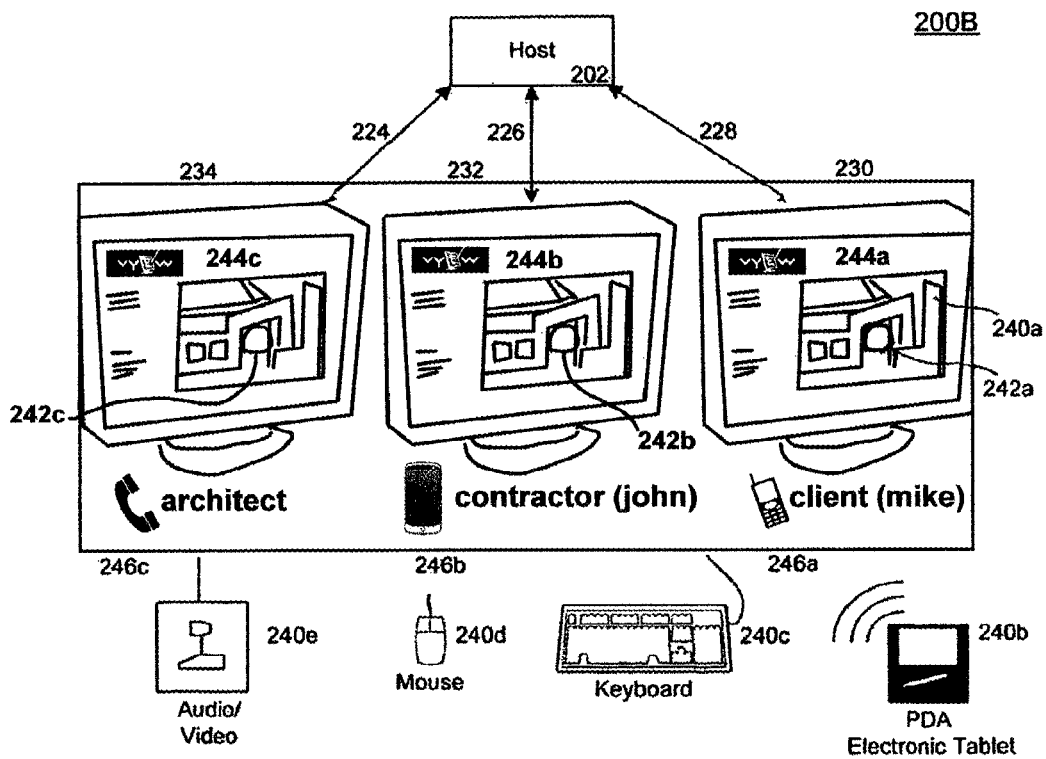
FIG. 2B illustrates an example of synchronizing an annotation of a drawing in a shared space through various input devices in accordance with an embodiment of the invention.

FIG. 2B illustrates an example of synchronizing an annotation of a drawing in a shared virtual space 244a to 244c through various input devices 240a to 240e during a web conferencing environment 200B. In an embodiment, the shared space 244a to 244c is a web-based shared environment such as a web browser where multiple users 230 to 234 can create, transform and delete a wide variety of media as well as annotate over or under said media. The example in FIG. 2B illustrates that user 230 as client Mike annotating a circle 242a over an image of a floor plan displayed on the computer monitor using an electronic or optical pen 240a. This action is synchronized and displayed on those sharing the same virtual space 244b as 244c in user 232 contractor John and user 234 Architect's computer monitors. All actions from any of the users 230 to 234 are also stored on the server 202 for later retrieval. If users 230 to 234 annotate the floor plan drawing at same location at the same time, the last input to the shared space 244a to 244c will be recorded and shown on the computer monitors.

Alternately, other input devices such as but not limited to a wireless PDA or electronic tablet 240a, a keyboard 240c, a mouse 240d, optical pointer, USB flash memory, stylus, audio or video equipment 240e such as a video camera or microphone or both can also be sent as inputs to the shared space 244a to 244c. The cellular phones 246a to 246c voice input can be integrated as a media layer over the other text or graphic layers during the teleconferencing.

The shared environment is multi dimensional thus allowing users 230 to 234 to sort information by not only content, but spatial, temporal and inter relationships between the media-layers created. Because the shared space 244a to 244c is virtual and not restricted to one image, more then one media can be placed within the same shared space 244a to 244c.

FIG. 3A to 3E are various browser screenshots 300A to 300F of a Graphical User Interface (GUI) illustrating a plurality of executable tool functions including the stage manager tools available for the collaborative media-layered platform. In an embodiment, the GUI shown in FIG. 3A includes standard window's editing tools 304a. The shared media workspace 310 acts as a container to support a plurality of media file formats and plug-in applications where layer-based authoring content can be easily moved, scaled, copied, pasted, layered and deleted. On-demand access to different content or sessions—saved and organized by topic, audience or version for example. A user list 306 and chat configurations 308 are also shown. Some examples include the Microsoft Office® and Adobe® PDF files, real time desktop sharing, photos, etc. shared media workspace 310 can import and export (to PowerPoint or PDF) for asynchronous work or archiving offline. Operation and UI of the client application in an offline mode is similar. This characteristic allows the user to continue annotating the media layer objects when offline (temporarily leaving the session), re-synching to the latest changes on the media layer or to the session when back online. The time and space synchronization of content changes and annotations enable users to publish content anywhere on the web, have presence awareness capabilities to know when other users are interacting with that content, and then interact with that user in real-time.

Figure 3A:
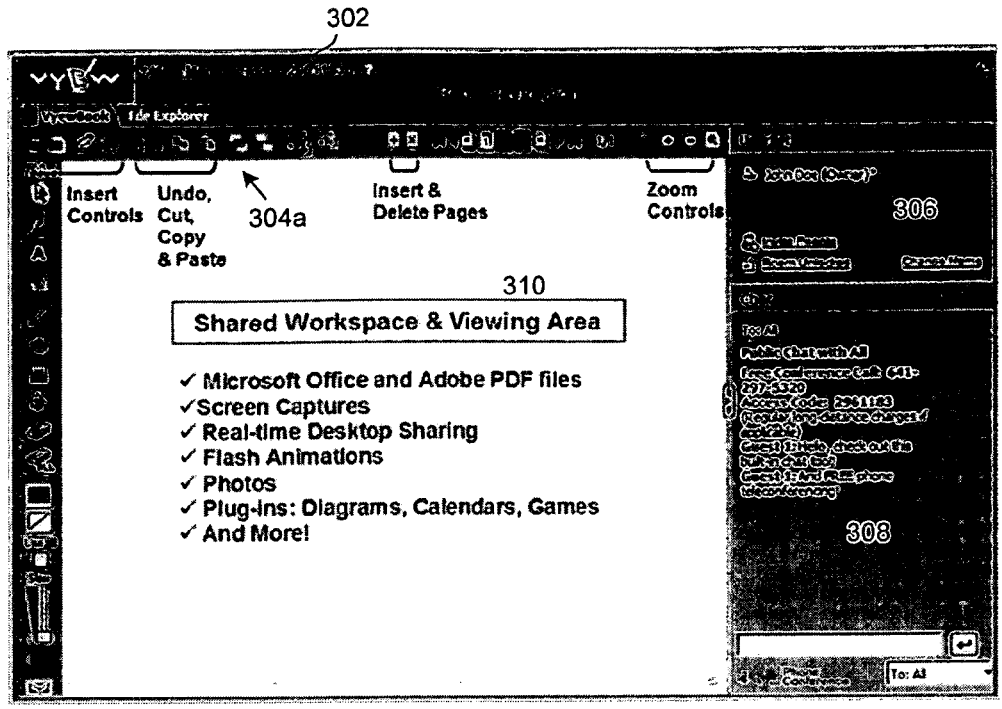
FIG. 3A depicts a browser with various functions and features of the invention in creating a collaborative multimedia platform in accordance with an embodiment of the invention.
Figure 3B:
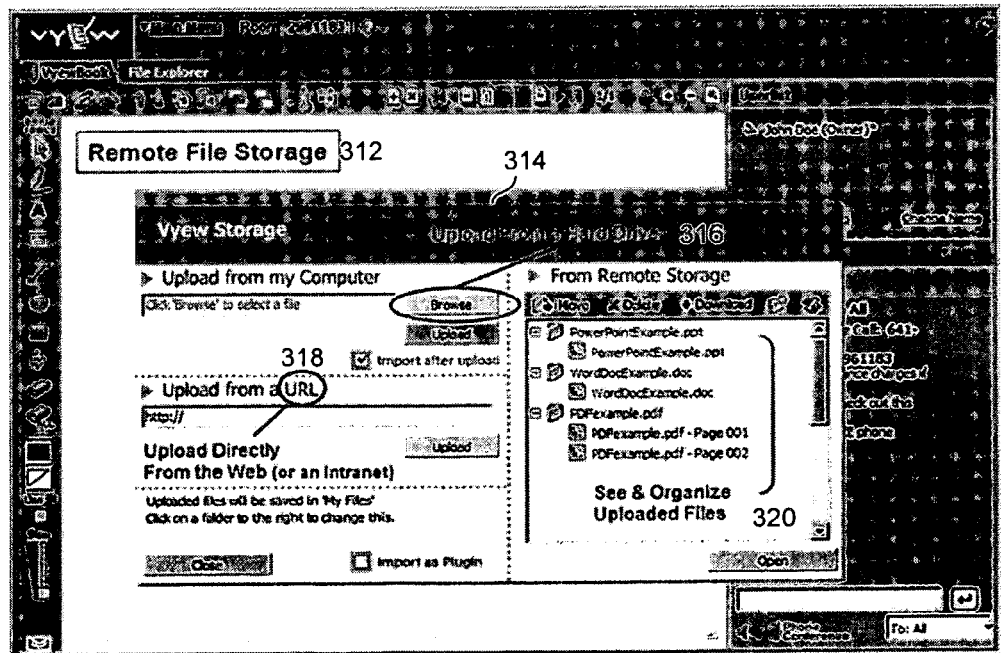
FIG. 3B depicts a browser with various functions and features of the invention in creating a collaborative multimedia platform in accordance with an embodiment of the invention.
Figure 3C:
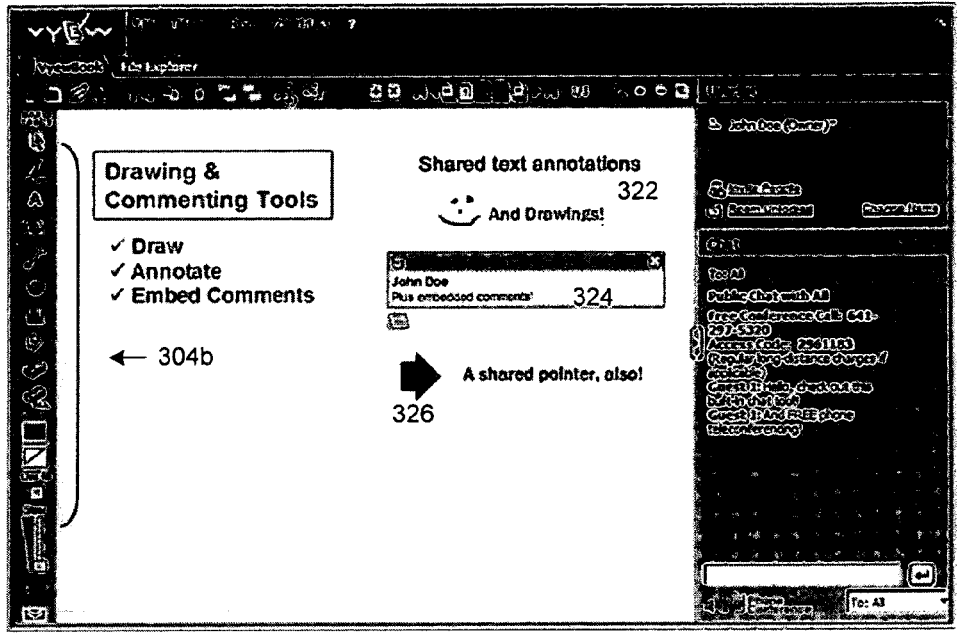
FIG. 3C depicts a browser with various functions and features of the invention in creating a collaborative multimedia platform in accordance with an embodiment of the invention.
Figure 3D:
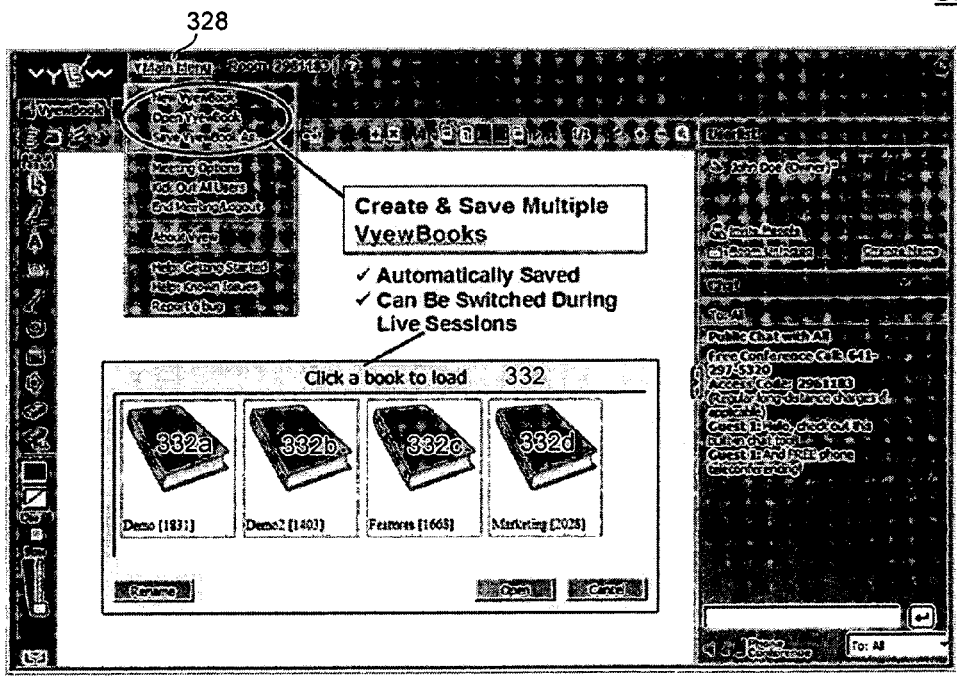
FIG. 3D depicts a browser with various functions and features of the invention in creating a collaborative multimedia platform in accordance with an embodiment of the invention.

FIG. 3B illustrates another window opened from the tool bar where the upload of files from a file storage remotely 318 or locally from a hard drive 316. For remote locations, files can be uploaded directly by providing a valid URL. A tree structure 320 shows the organization of the files through a web service 106a from a remote file storage 108a such as one shown in FIG. 1C1 or from the local hard drive 316 or other storage devices accessible from a client computer. In FIG. 3C, new media 322 and text 324 can be created as new media-layers using the tools 304b. 326 shows a shared pointer object that maintains its position across all clients in real-time functioning as a surrogate mouse pointer. FIG. 3D illustrates GUI tools invoked to support the book typical metaphor. Using the main menu 328 to open, create or save a collection, illustrated here as a 'book' to be shared and viewed by the users in the session. Books 332a to 332d can be switched during a session by the users.

Figure 3E:
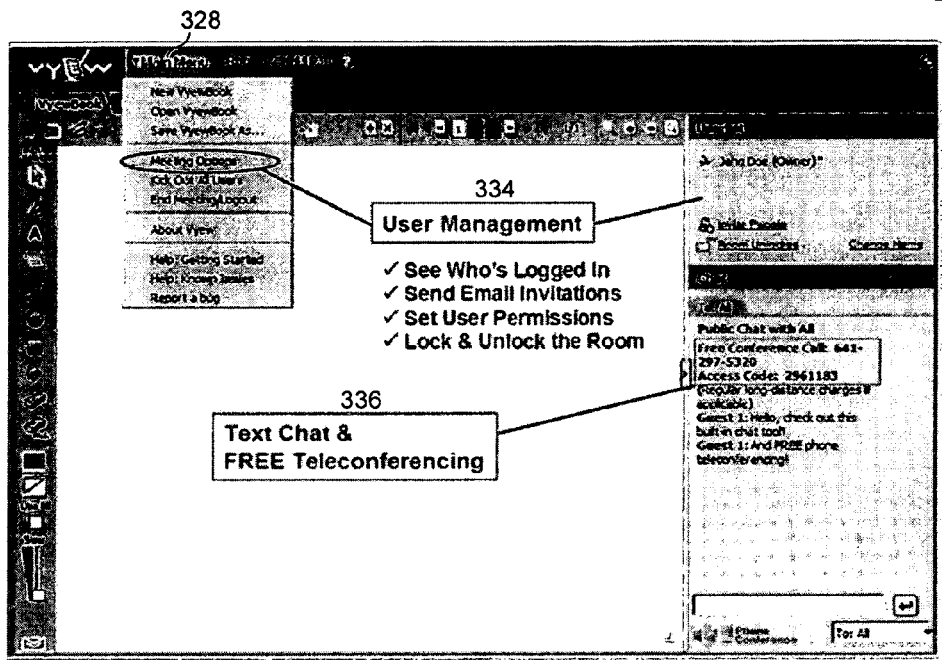
FIG. 3E depicts a browser with various functions and features of the invention in creating a collaborative multimedia platform in accordance with an embodiment of the invention.
Figure 3F:
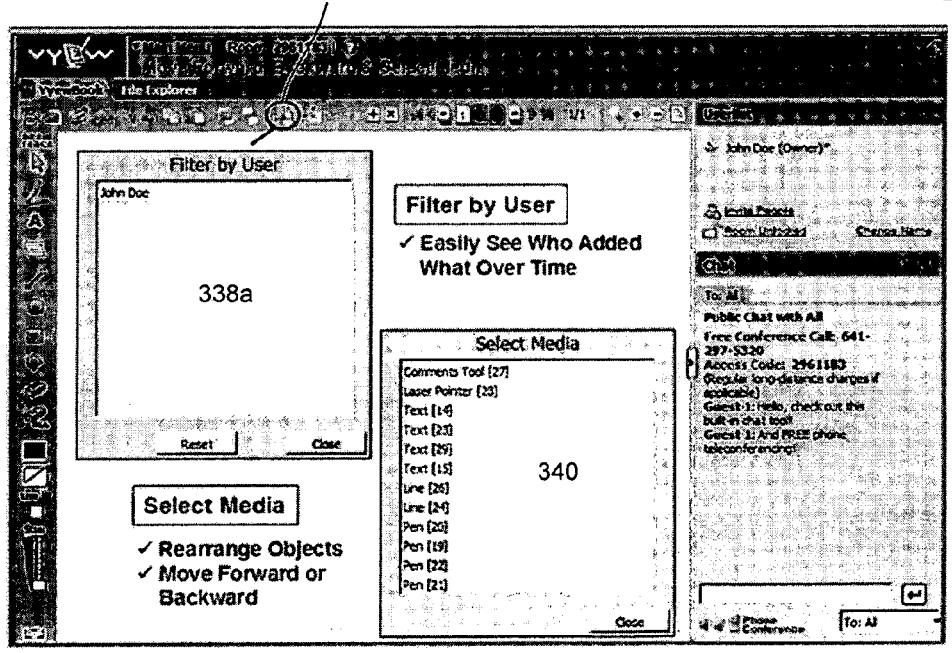

FIG. 3E illustrates the user management 334 function can be invoked by selecting meeting option from the main menu tool bar 328. The user management function allows user to see who is logged in, send email invitations, set user permissions, lock and unlock the room for the shared session. The option of using teleconferencing 336 by using online VOIP (Voice Over IP), cell or common POTS while interacting in real time with users during the session can be done by providing an VOIP client or phone number and access code for those users given permission to access said voice service. FIG. 3F illustrates a 'filter by user' tool 338 where a window 338a is opened to display the ID labels (name) of all users that have created a media-layer on the current page. Objects can be hidden or unhidden based on the selection of one or more names. This same filtering is also achieved based on the time when media-layers were created and/or modified. Another select media window 340 allows the selection of media-layers based on the media-layer's ID label.

Figure 4:
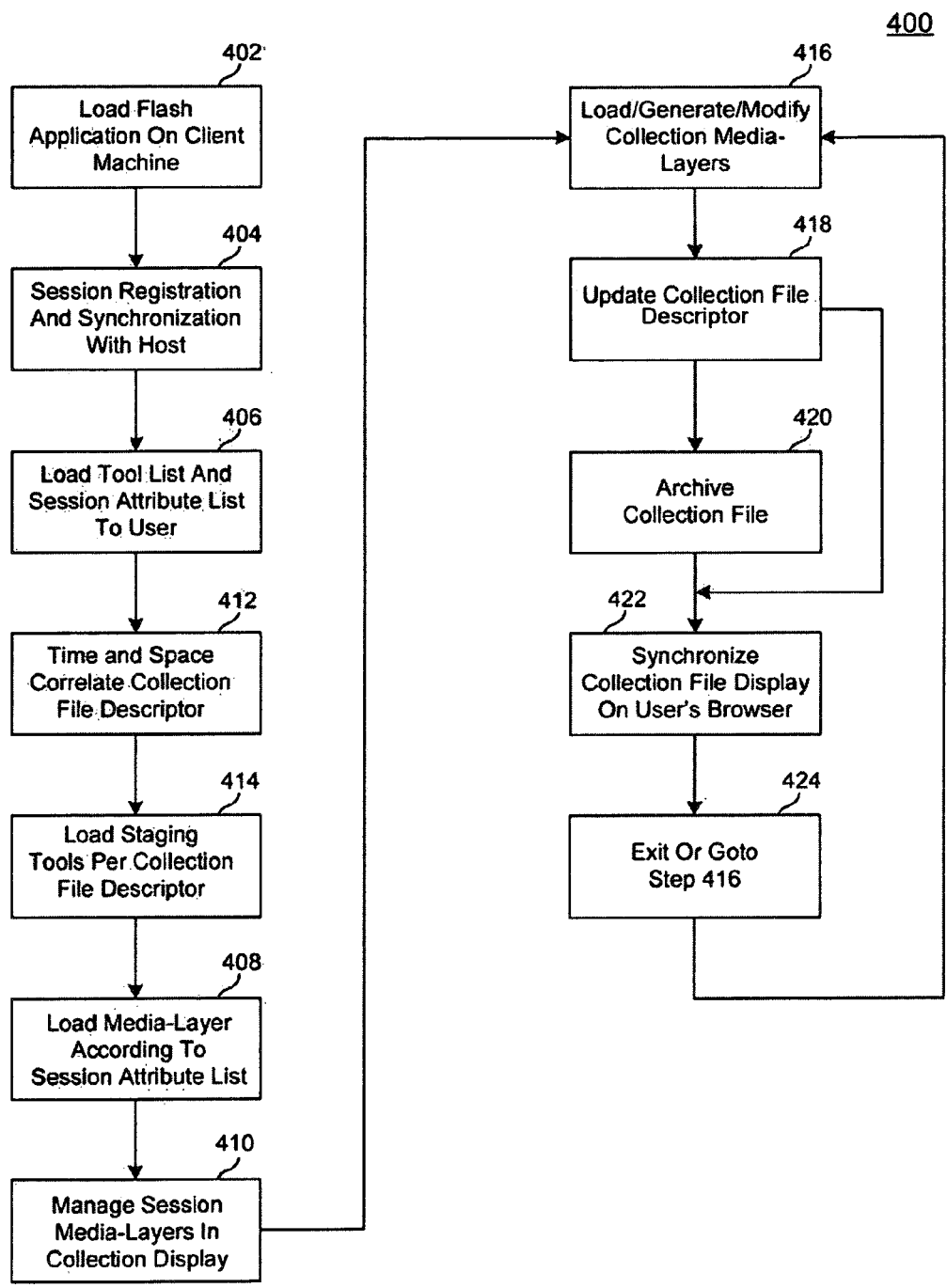
FIG. 4 is a flow chart depicting a method to collaborate a web browser based media-layered session in a network environment in accordance with an embodiment of the invention.

FIG. 4 is a flow chart 400 depicting a method to collaborate a web browser based media-layered session between two or more users in a shared environment. In an embodiment, the shared environment is an Ethernet WAN or LAN network, a fiber optic communication direct link, a Flash application is loaded on each registered client computer in step 402. In step 404 the flash application on the client computer connect to a host server after being authenticated. The host registers the users and opens a session to support synchronous communication. In step 406, the host retrieves from a database the identity of user and sends a tool list to be loaded by the flash application on the client. In step 408, the flash application will load one or more media-layers in response to the receipt of a session attribute list from the host. If no specific attribute is specified, a default media-layer is loaded. One of such tools is the stage manager tool. In step 410 a plurality of media-layers form a collection; where the collection is managed by the stage manager tool, only the active layers are viewable by users, the inactive layers are hidden from view. In step 412, the collection is correlated with information including time last modified and 3D space coordinates into a file descriptor suitable for network equipment communication such as an XML file. In step 414, the user web browser loads staging tools from the stage manager according to the user's collection file descriptor received. The collection file descriptor can be a file from a remote file storage location or from the user's local hard drive. If no particular format is specified, the staging tool will load one or more default media-layers for the session. In step 416, the user can load an existing file with a collection of media-layers from a remote location on the web by specifying URL address or from a local hard drive. The user can also generate new or modify the loaded media-layers. In step 418, the modifications that are user's inputs include annotation, delete, insert, copying, pasting or drawing to the media-layers. The updated collection file descriptor can be stored for later retrieval by the users in step 420, or can be accessed by other users logged in the same session in step 422. In step 424, if all tools and media-layers loads are completed, the process ends until further inputs from any of the users in the session.

A knowledge workflow generally defines a sequence of operations to be performed by individuals that are by way of example, teachers or students in learning environments, production management planners and coordinators, engineering development personnel, software developers, marketing and sale's personnel, loan processing agents, employment application specialists, insurance claims management and personnel, purchase agents involved in purchasing requisitions, online credit verification individuals, patient medical records management staff, personnel involved in the distribution and sign-off of business documents, editorial steps in a production environment.

The system and method of this invention permits any cohort member, which may include employees, students, and collaborators working as a group, to automatically transmit information to, and receive information from, others in the group. As illustrated in FIGS. 1A, and 1B, the computer-based collaboration may occur locally among users connected to, or operating with, one computer, and server or over a network, such as the Internet, wherein each of the users is located at a computer connected to the network. One of these models is a client-server model, in which all collaborators are connected at the same time or asynchronously, i.e., different times, via the network, to a central server. Information generated by each collaborator is sent over the network to the server that then broadcasts the information back over the network where it is viewable by other collaborators. In accordance with the foregoing users can be invited into, enter and leave a shared space during an ongoing project. The project work flow responds to user activity and interactions within the shared space by generating changes or signaling completions.

As used herein, manuals and other documents generated in accordance with the present invention are by way of example and not limitation, referred to as electronic documents, such as catalogs, forms, electronic manuals, electronic research papers, but is not limited to text, images, and workflow which optionally may contain formatting tags such as Hyper Text Markup Language tags, Extensible Markup Language tags, other meta tags, as well as words used for formatting such as those embedded with rich text format documents.

Figure 5:
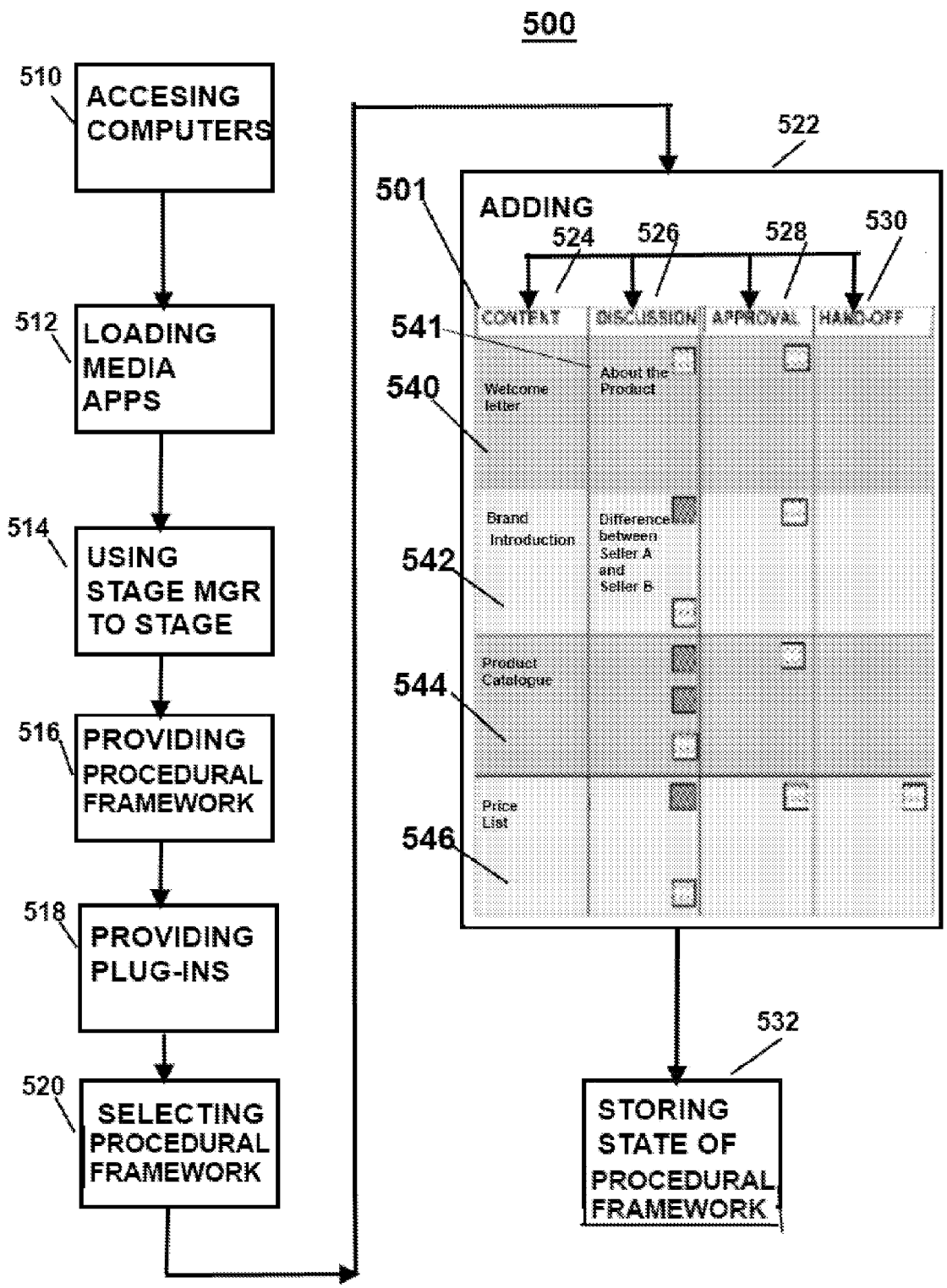
FIG. 5 is a flow diagram of the method of creating a procedural framework in a workflow process in accordance with an embodiment of the invention.

By way of an overview, the computer system, readable medium and method to track the activities residing in a procedural framework or more generally a procedural framework 501 (procedural framework) is illustrated in FIG. 5. By way of example, a user, such as a manager, can view the procedural framework and determine at a glance the status of a project in each room (See, FIG. 6 for a depiction of a room) for each project. Typically when dealing with knowledge work groups, four components exist: 1. Content or a collection of content that may be pertinent to a project user; 2. Discussion, where one or more discussion points exist for recommending courses of action, raising questions, reporting status making resolutions or drawing conclusions; 3. Approval, pertaining to the title of the section; 5. Hand off—which completes the general cycle of knowledge work flow. If a manager looks at a collection of procedural framework, each procedural framework being a page, then a manager can see the status of every project under management. All such procedural framework pages can be collected in one room then by browsing the pages of this room, a manager or instructor will be able to see the progress of all the projects under management or each student's progress.

Figure 6:
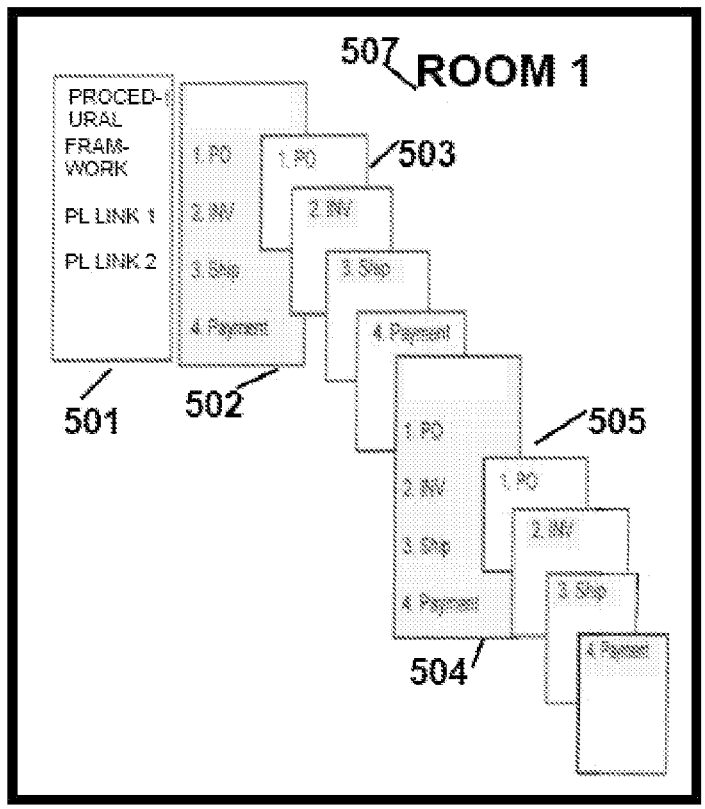
FIG. 6 depicts functionally the overlay of a procedural framework template onto a collaborative working procedural framework showing rooms in accordance with an embodiment of the invention.
Figure 6:
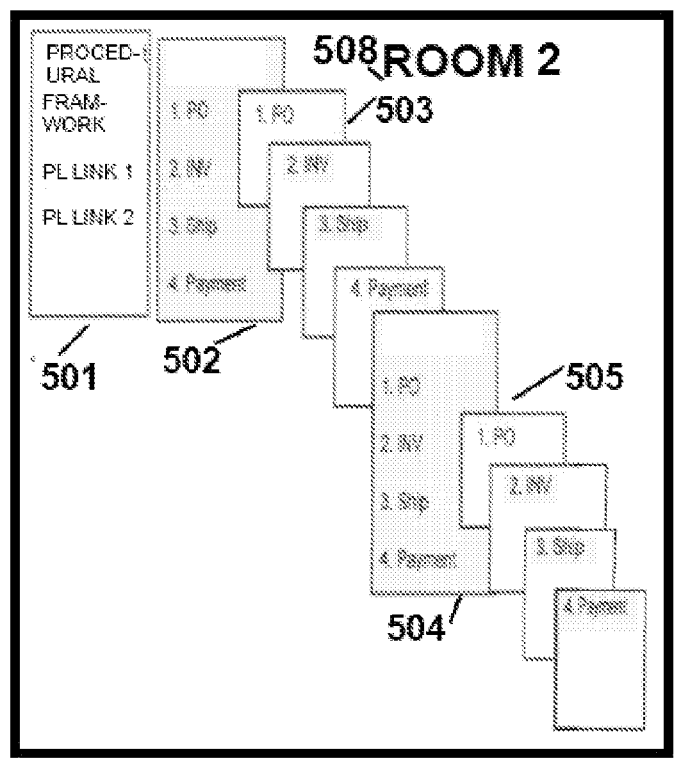

Referring again to FIG. 5, to generate the procedural framework, such as procedural framework 501, a user may start with a blank slate and build section by section, by clicking "Add section", as is provided for in a user-interactive browser (such browser, graphic and word processing technology is well-known by those of ordinary skill in the art of programming) then adding for example at column heading Content 524, a section heading such as "Welcome letter", 540, followed by adding under the column heading titled Discussion, section heading "About the product", 541 etc. The Discussion column 526, contains in this example four sections. Each section can have multiple items listed for discussions. Returning our attention to Content 524, section 542 contains, "Brand Introduction". If a user clicks on the "Brand Introduction" it is hyperlinked to jump to a related page, that will include more information related to the subject "Brand Introduction". As the user pages through an item in the sections, of section 542 by way of example, the items as listed in Discussions remain on every page, until the user transitions to the next section, e.g., the "Product Catalog", in section 544. This is illustrated in FIG. 6.

In the Approval, 528 section the user can click on a button within that column and assign and/or request approval as required from certain individual. This then will set up a reminder in the pages of that section requesting approval. When approval is requested and when the appropriate individual approves the section or the content in the section, then the entire room 507 where all the content resides for that procedural framework, (See, FIG. 6) is permanently stored, i.e., the state of the room is saved indefinitely. At least one motivation for permanency is so that if there is inquiry or debate regarding a project, such as by way of example, a particular approval, the exact state of the room with all the content and discussions can be restored for review.

More particularly, with reference to FIG. 5, the invention more particularly relates to the field of collaborative computing in a shared network space, and to a computer method 500 for managing a work flow collaborative file having a GUI including a display and a selection device for displaying a procedural framework 501, the method 500 includes the steps of: accessing 510 one or more user computers in the shared space in the network, wherein the shared space is created by interaction of executable codes in a host and a user application and the shared space is described by a session attribute list;

loading a media application 512 with a plurality of tools into one or more user computers;

using a stage manager tool from the media application to stage and correlate 514 a plurality of media-layers according to spatial, temporal and relational coordinate data in the user application, wherein the media-layers data are described by at least one file descriptor inputting multi type content including one or more of text documents, graphic images, video images, audio or data files into the shared space;

providing one or more procedural framework templates 516 to a workflow process with specific layouts;

providing plug-ins for each type content 518 with in the workflow process;

selecting a procedural framework template 520 for the creation of a workflow process, or editing a procedural framework template or creating a procedural framework from the beginning;

adding one or more sections to the procedural framework template that include:
 (1) a content process section 524 that includes at least one item of (a) steps to be performed or (b) content materials;
 (2) a discussion point section that optionally includes one or more of a topic of discussion item corresponding to one item of the content process section;
 (3) an approval section that optionally includes one or more of an approval item corresponding to one item of the content process section; and
 (4) a hand-off section that optionally includes one or more of a hand-off item corresponding to one item of the content process section;
 storing state of the procedural framework 532 by a user at any time during its use or in response to a user approved initiation signal, indicating that a section has been completed.

Turning attention again to FIGS. 5, 6, the method 500 also includes a second user performing the steps of approving or disapproving the completion of a task as specified in a section, such as sections 524-530. A method 500 of the present invention further includes the step of a user moving the procedural framework 501 between one of one or more room, 507-508 in a library or a website on the World Wide Web. A method 500 of the present invention further includes: 1. the step of a template containing one or more: hotlinks, meta tags and computer code placed in the directory of text documents, graphic images, video images, audio or data files; 2. the procedural framework template specifying where content 501 are placed among the sections of the procedural framework 501; 3. dynamically swapping in and out procedural framework 501 within a room, 506 as dictated by the use to which the procedural framework 501 is put; 4. a user electronically notifying another user of the availability of procedural framework 501 for one or more of viewing, changing or accessing an information content 501 resource; 6. creating a derivative copy of the procedural framework 501; 7 a user editing the procedural framework 501. The method 500 of the present invention further includes the step of installing a conversion program for accessing through a browser text documents, graphic images, video images, and audio or data files; 8. tracing and storing the author, time and content 501 of the change; 9. using a browser for one of uploading content 501, creating a new procedural framework 501 or scheduling a meeting; 10. publishing the procedural framework 501; 11. copying the procedural framework 501; 12. embedding the procedural framework 501 into in any web property; 13. using a template to permit content 501 creators to determine where to place the content 501 within a workflow; 14. using the template to dynamically swap in and out pages within the room, 506 as dictated by the use to which the workflow are put; 15 using the template to permit the use of one or more of dynamic buttons and plug-in features such that users of the workflow template may access tables of content 501 that reside within one or more libraries having tables of content 501; 14. one or more of: embedding into the procedural framework 501 in an autonomous software agent to trigger one of the creation, duplication and/or publication of copies or pages of the procedural framework 501; 15. one or more of: filtering to moderate and filter input, viewing permission, copying and publication. Each of the foregoing steps are programmed and embodied in executable software, the programming required being well-known by those of ordinary skill in the programming arts.

Many projects, given their size and complexity, require project management as well as both independent contribution and the collaboration of many individuals. Now, referring to FIGS. 5,6 and 7A, by way of example, a sales project for contacting potential customers may require column sub-sections such as 540-546 with user selectable titles that include, by way of example and not limitation: a welcome letter 710, a brand introduction 711, a product catalog 713, a price list 714. The list may be expanded to include such items as product warranty or product installation manuals (not shown). The present invention allows the incorporation of documents and actions into an activity workflow.

As depicted in FIGS. 5, 6, and 7A, each sub-section 540-544 may contain subparts that are contained in the subsections, such as 503, labeled for example as "1. PO", which itself may have linkable, embedded or accessible sub-sub parts having detailed specifications for further documents, presentations, or actions (not shown). The project creator may then generate within a second section, such as discussion 526, on the same row as a corresponding title, such as for example "Welcome letter 710 in the first section Content 524 that may serve as a discussion point. The project creator then generates within a third column on the same row as a corresponding title in the first column or section that serve as an approval point. The project creator then generates within a fourth column on the same row as a corresponding title in the first column or section to serve as a next step, as shown by the example as hand-off, 530 to the designated person Henry. There is no theoretical limit as to how many sections or columns can be generated that correspond to the title in the first section or column, respectively.

Referring again to FIG. 6, the invention relates to electronic documents in a virtual shared space referred to as a "room", such as Room 507 and Room 508 for purposes of planning, organizing, collecting, managing and controlling a set of tasks by allowing the creation of a workflow process, by developing a user-selectable hierarchically structured procedural framework 501 (procedural framework) and templates 502, 504, a subclass of procedural framework1 and procedural framework2, where each depicts steps in a management and task process having benchmarks or salient materials as part of the process 500.

As shown in FIGS. 7A, 8A, additionally the invention provides an environment for developing and creating procedural framework 501 entries through: importing content for external sources stored on media or accessed on-line, (using programming techniques well known to those of ordinary skill in the programming arts), into the content section 524, such as by way of example and not limitation, the "Welcome letter", 710, or Brand Introduction, 711. As previously indicated, in the discussion section 526, the user may generate discussion points, such as by way of example and not limitation "Difference between Seller A and Seller B", 712. The discussion section 526 may be optionally used to assign tasks or track progress on task execution. The approval section 528 allows the user to approve actions, progress or project completion, storing the state of the procedural framework 501 or an aspect of a project, displaying and publishing the results.

Referring to FIG. 7A, the sections 524-530 are further editable by one or more individuals to include the pertinent materials or to in some manner control the work flow, such as creating ticklers or discussion items 712, setting completion dates, adding criteria for approval and the approval boxes, linkable to a side-panel (FIG. 8A, 827) that is accessible in each page that may be required regarding the tasks or materials contained in a section.

Figure 7B:
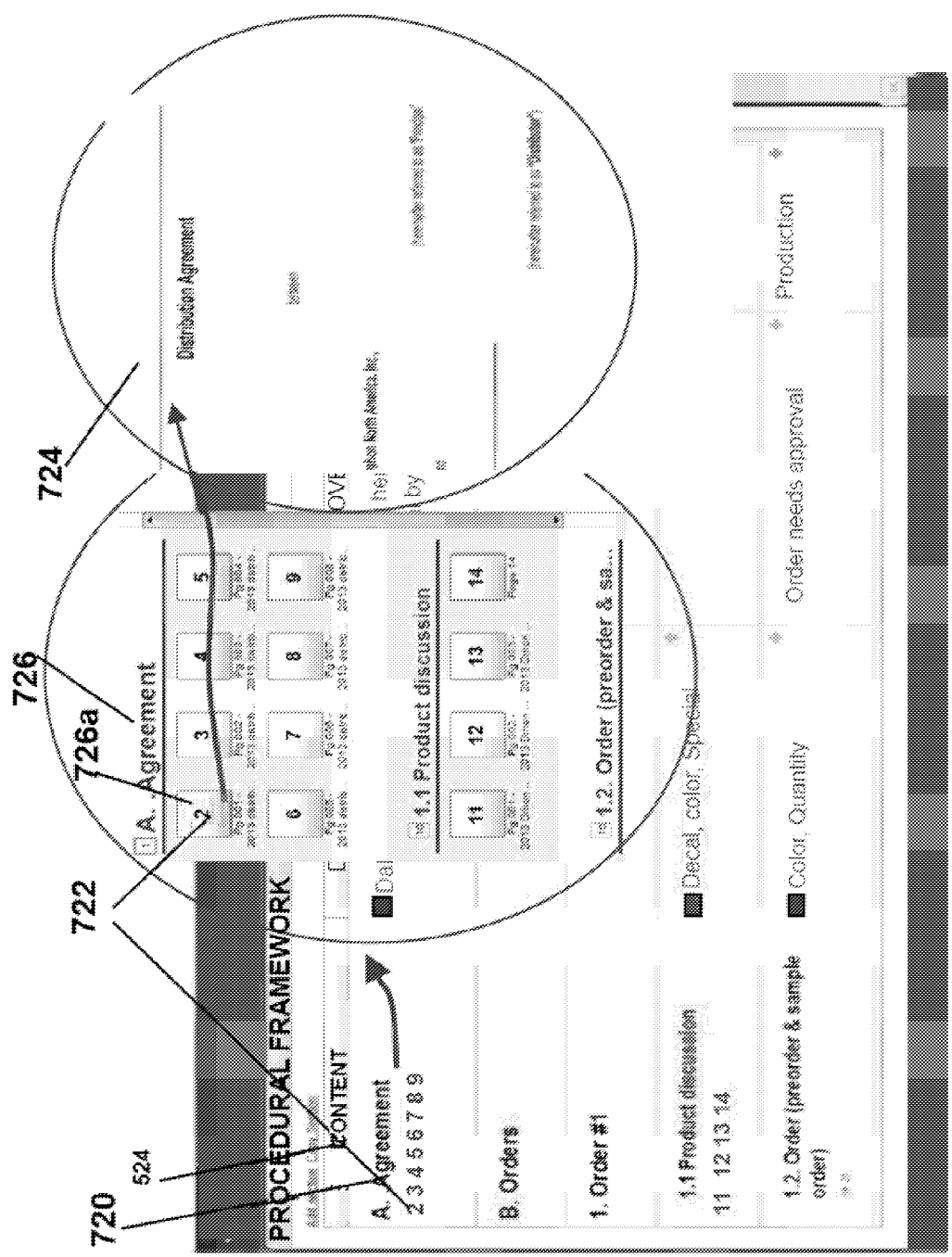
FIG. 7B depicts a browser having therein a collaborative working procedural framework in accordance with an embodiment of the invention.

Turning to FIG. 7B, procedural framework 501 entries are shown under Content 524 and Agreement 720. In this example, there are nine pages to this section the first page is on page number no. 2, referenced 722. The room also provides a page navigation tool 726 which corresponds to the procedural framework 501. Clicking on the Agreement 720 will open the first page of the Agreement section. Clicking on 722 in the procedural framework 501 or clicking on 726A of the page navigation tool 726 will, by way of example, display the underlying agreement on page 2 in the room, such as Distribution Agreement 724.

FIG. 8A shows a procedural framework 501 and an associated side-panel 827 assists in coordinating and tracking progress in accordance with the process 500 on the work or document formation, which is part of a project, work flow. There can be three or more states or notices in the Approval column. A tickler or notice at 807 prompts the user in the user side-panel window 827, that Approval 528 "Need Customer Approval" 801 is required. When Approval is requested from Customer through a function in the process 500 then procedural framework in the Approval column will change from "Need Customer Approval" to "Waiting for Customer Approval." Arrow 805 in the side-panel points to the area where the Customer will see a reject button 811 and an accept button 812, which allow the individual whose approval is required to choose one or the other. And finally notice 809 indicates the required "Approval by customer" has been satisfied, and the notice in the procedural framework will then read "Approved by Customer" 817.

Figure 8B:
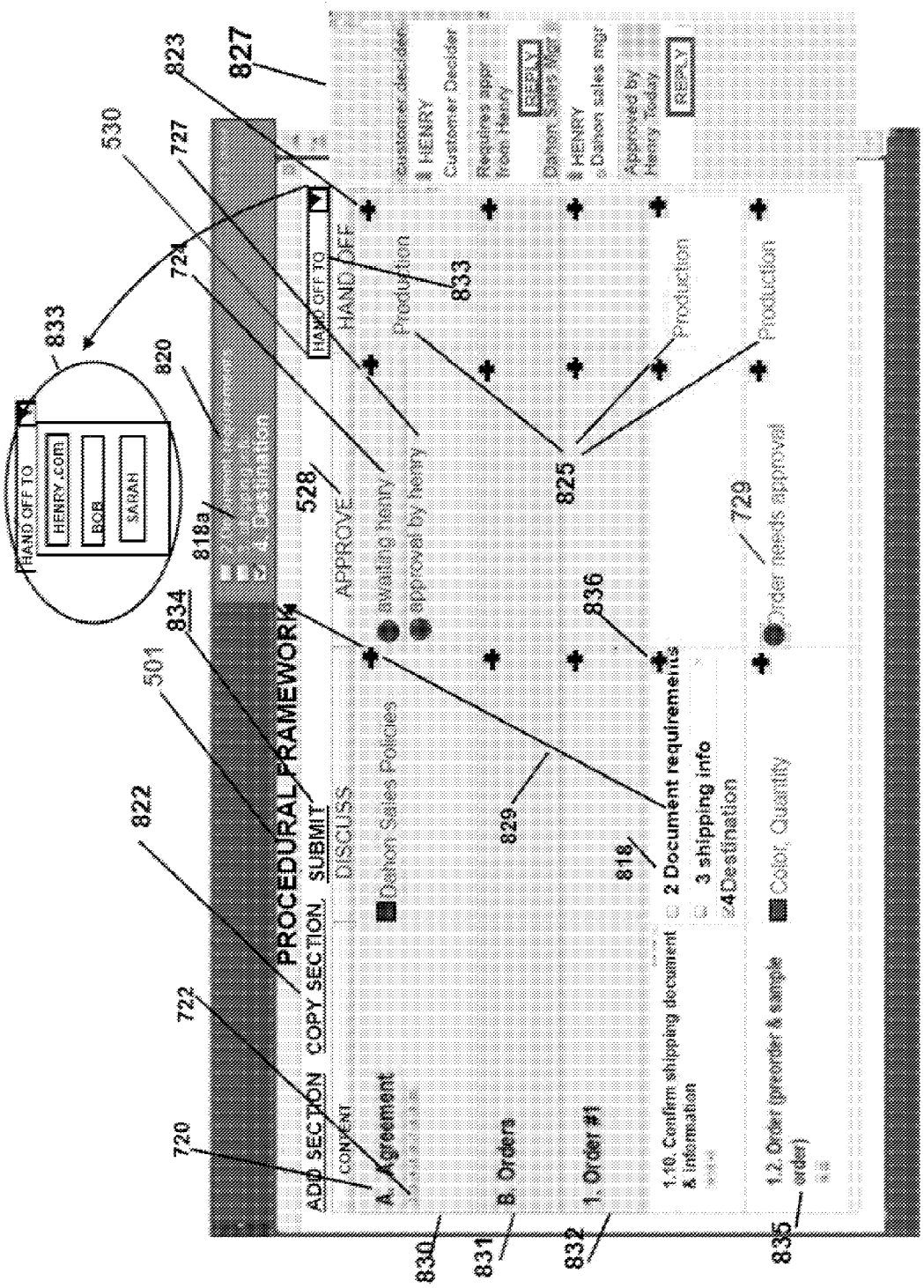
FIG. 8B depicts a browser having therein a collaborative working procedural framework in accordance with an embodiment of the invention.

Turning to FIG. 8B, discussion items in the procedural framework 501 such as by way of illustration, and not limitation, shows a designated list 818 having "2. Document requirements", "3. Shipping info" and "4 Destination". Any such list such as this list will be also displayed in a window 820 as a prompt list 818a "2. Document requirements", "3. Shipping info" and "4 Destination" 820 in each section corresponding to the sections in the procedural framework 501. If a discussion item is checked as shown by example, "Destination" in prompt list 818a in the working pages of procedural framework 501, then it will be also checked in the prompt list 818a and vice versa.

When a handoff is activated through window 833 then it will display a list of users that had been previously inputted into the handoff column 530. And when a user is selected, then all the pages with its content 524 and discussion 526 in the sections with the user listed will be copied and placed in a new room. Similarly, the user can highlight sections, as for example three sections, as highlighted in gray, and indicated as rows 830, 831, and 832 shown in FIG. 8B, by clicking a mouse on the hyperlink entitled Copy Section 822 and the process 500 copies the three sections in new rooms or in the same room. The user can also hand off the three sections to another user of the system. In the procedural framework 501 the user hands-off, in this case to Production 825 listed in row 830 illustrated under handoff, by clicking on button 823. When the user desires to handoff to another user, it collects the handoff, and in this exemplary case clicks on the appropriate Production 825 of interest. The system responds with a handoff to whom the user choses, by clicking, window 833 to bring down a list of candidates for potential hand offs, as in this example Henry.com, Bob and/or Sara. Note that the process automatically makes a copy of only the sections that the user requests and hands it off to the individual or address chosen in window 833. When the user "clicks submit" at the hyperlink Submit 834, the process 500 creates a new room in that named person's account to whom the user handed off the sections. Even though a room may have many sections, the three sections as in this example, are handed off to the individual chosen, as for example Henry.com. In this manner a user can complete one or more sections and hand it off even though the greater project itself has not been fully completed. It permits a section by section handoff to various individuals or departments.

The user can retrieve documents within a section. Under Approved there are three states or statuses listed. In section A, row 830 there are two: "awaiting henry" 724, "approved by henry" 727 and in Section 1.2, row 835, one status: "order needs approval" 729. When the user goes to a section, such as section 1.2 835, regardless which page the user is viewing, the user will be reminded that approval is needed. In this example the user can assign the requirement for approval to another user, in this instance Henry.

As shown in FIGS. 1A, 1B, 1C, and 5, one embodiment the present invention includes a non-transitory computer readable medium having computer-executable instructions for creating a work flow collaborative file in a shared network space including the steps of:

accessing one or more user computers in the shared space in the network, wherein the shared space is created by interaction of executable codes in a host and a user application and the shared space is described by a session attribute list;

loading a media application with a plurality of tools into one or more user computers; using a stage manager tool from the media application to stage and correlate a plurality of media-layers according to spatial, temporal and relational coordinate data in the user application, wherein the media-layers data are described by at least one file descriptor inputting multi type content including one or more of text documents, graphic images, video images, audio or data files into the shared space;

providing one or more procedural framework 501 templates to a workflow process with specific layouts;

providing plug-ins for each type content with in the workflow process;

selecting a procedural framework 501 template for the creation of a workflow process;

adding one or more sections 524-530 to the procedural framework 501 template that include:

(1) a content process section 524 that includes at least one item of (a) steps to be performed or (b) content materials;

(2) a discussion point section that optionally includes one or more of a topic of discussion item corresponding to one item of the content process section;

(3) an approval section that optionally includes one or more of an approval item corresponding to one item of the content process section; and (4) a hand-off section that optionally includes one or more of a hand-off item corresponding to one item of the content process section;

storing state of the procedural framework 532 by a user at any time during its use or in response to a user approved initiation signal, indicating that various items within a section has been completed.

The invention also relates to a method wherein the media application is by way of example and not limitation, a Flash application, Java application or browser based scripts.

The invention also relates to a method of a user moving pages in the workflow between one or more rooms 507, 508 as depicted in FIG. 6 and to/from a website on the World Wide Web. The invention also relates to a method of using a template to permit content creators to decide where to place the content within a workflow; using the template to dynamically swap in and out pages within the room 507, 508 as dictated by the use to which the workflow are put; and using the template to permit the use of one or more of dynamic buttons and plug-in features such that users of the workflow template may access tables of content 501 that reside within one or more libraries having tables of content.

The invention further relates to methods for publishing the room 507, 508, storing the procedural framework 501 in a library for publication, embedding the procedural framework 501 into in any web property, embedding into the procedural framework 501 as an autonomous software agent to trigger one of the creation, duplication and/or publication of copies of procedural framework 501 and filtering, viewing permission, copying and publication.

The computer system depicted in FIGS. 1A, 1B and 1C for creating a work flow collaborative procedural framework in a shared space within a network comprises: a host server 180 that communicates to a database 104 and a file storage 108 through a network; a user machine (130-134) with a user application that logs to the host server to join a shared space session with other user machines running user applications, wherein the shared space session is generated by interaction of executable codes in the host and the user application and the shared space session is described by a session attribute list;

a first memory for storing application code with a plurality of tools into one or more user computers;

an input device for inputting multi type content including one or more of text documents, graphic images, video images, audio or data files into the shared space; a stage manager tool from the media application to stage and correlate a plurality of media-layers according to spatial, temporal and relational coordinate data in the user application, wherein the media-layers data are described by a file descriptor inputting multi type content including one or more of text documents, graphic images, video images or data files into the shared space;

and a display for displaying the content by computers in the shared space in one of a synchronous or asynchronous mode; a second memory for storing (a) collaborative procedural framework templates to create pages with specific layouts, (b) plug-ins for each type content for searching additional resource information, (c) converters for accessing through a browser the content of the procedural frameworks, such as 501, FIG. 5, each such procedural framework including:

(1) a content process section 524 that includes at least one item of (a) steps to be performed or (b) content materials;

(2) a discussion point section that optionally includes one or more of a topic of discussion item corresponding to one item of the content process section;

(3) an approval section that optionally includes one or more of an approval item corresponding to one item of the content process section; and (4) a hand-off section that optionally includes one or more of a hand-off item corresponding to one item of the content process section.

While the foregoing invention has been described with reference to the above embodiments, additional modifications and changes can be made without departing from the spirit of the invention. Accordingly, such modifications and changes are considered to be within the scope of the appended claims.

The invention claimed is:

1. A computer method for managing a work flow collaborative file having a GUI including a display and a selection device for displaying a procedural framework, the method comprising the steps of:

accessing one or more user computers in the shared space in the network, wherein the shared space is created by interaction of executable codes in a host and a user application and the shared space is described by a session attribute list;

loading a media application with a plurality of tools into one or more user computers;

using a stage manager tool from the media application to stage and correlate a plurality of media-layers, and ordering the media-layers, according to spatial, temporal and relational coordinate data in the user application, wherein the media-layers data are described by at least one file descriptor inputting multi type content including one or more of text documents, graphic images, video images, audio or data files into the shared space;

providing one or more procedural framework templates to a workflow process with specific layouts;

providing plug-ins for each type content with in the workflow process;

selecting a procedural framework template for the creation of a workflow process;

adding one or more sections to the procedural framework template that include:

(1) a content process section that includes at least one item comprising (a) steps to be performed or (b) content materials;

(2) a discussion point section that optionally includes one or more of a topic of discussion item corresponding to one item of the content process section;

(3) an approval section that optionally includes one or more of an approval item corresponding to one item of the content process section; and (4) a hand-off section that optionally includes one or more of a hand-off item corresponding to one item of the content process section;

storing state of the procedural framework by a user at any time during its use or in response to a user approved initiation signal, indicating that an item within a section has been completed.

2. The method herein also includes a second user performing one of the steps of approving or disapproving the completion of a section in the procedural framework.

3. The method of claim 1, further comprising the step of a user moving the procedural framework between one of (a) one or more rooms in a library or a website on the World Wide Web.

4. The method of claim 1 further comprising the step of a template containing one or more: hotlinks, meta tags and computer code placed in the directory of text documents, graphic images, video images, audio or data files.

5. The method of claim 1 wherein a template specifies where content are placed among the sections of the procedural framework.

6. The method of claim 1 further comprising the step of dynamically swapping in and out procedural frameworks within a room as dictated by the use to which the procedural frameworks are put.

7. The method of claim 1 further comprising the step of a user electronically notifying another user of the availability of procedural frameworks for one or more of viewing, changing or accessing an information content resource.

8. The method of claim 1 further comprising the step of creating a derivative copy of the procedural framework.

9. The method of claim 1 further comprising the step of a user editing the procedural framework copy.

10. The method of claim 1 further comprising the step of installing a conversion program for accessing through a browser text documents, graphic images, video images, audio or data files.

11. The method of claim 1 wherein a trace record and stores the author, time and content of the change.

12. The method of claim 1 further comprising the step of using a browser for one of uploading content, creating a new procedural framework or scheduling a meeting.

13. The method of claim 1 further comprising the step of saving the state of the room at the instant of any approval.

14. The method of claim 1 further comprising the step of copying the procedural framework.

15. The method of claim 1 further comprising the step of embedding the procedural framework into in any web property.

16. The method of claim 1 further comprising using a template to permit content creators to determine where to place the content within a workflow; using the template to dynamically swap in and out pages within the room as dictated by the use to which the workflow are put; and using the template to permit the use of one or more of dynamic buttons and plug-in features such that users of the workflow template may access tables of content that reside within one or more libraries having tables of content.

17. The method of claim 1 further comprising one or more of the step: copying, or the same procedural framework pages or having the same procedural framework pages collected into one room.

18. The method of claim 1 further comprising one or more of the step of: approving at least one approval item, corresponding to one item of the procedural framework sections or handing-off to a user at least one hand-off item corresponding to one or more items of the procedural framework section.

19. A non-transitory computer readable medium having computer-executable instructions for creating a work flow collaborative file in a shared network space comprising the steps of:
- accessing one or more user computers in the shared space in the network, wherein the shared space is created by interaction of executable codes in a host and a user application and the shared space is described by a session attribute list;
- loading a media application with a plurality of tools into one or more user computers;
- using a stage manager tool from the media application to stage and correlate a plurality of media-layers, and ordering the media-layers, according to spatial, temporal and relational coordinate data in the user application, wherein the media-layers data are described by at least one file descriptor inputting multi type content including one or more of text documents, graphic images, video images, audio or data files into the shared space;
- providing one or more procedural framework templates to a workflow process with specific layouts;
- providing plug-ins for each type content with in the workflow process;
- selecting a procedural framework template for the creation of a workflow process;
- adding one or more sections to the procedural framework template that include:
  (1) a content process section that includes at least one item comprising (a) steps to be performed or (b) content materials;
  (2) a discussion point section that optionally includes one or more of a topic of discussion item corresponding to one item of the content process section;
  (3) an approval section that optionally includes one or more of an approval item corresponding to one item of the content process section; and
  (4) a hand-off section that optionally includes one or more of a hand-off item corresponding to one item of the content process section; storing state of the procedural framework by a user at any time during its use or in response to a user approved initiation signal, indicating that a section has been completed.

20. A computer system for creating a work flow collaborative procedural framework in a shared space within a network comprises: a host server that communicates to a database and a file storage through a network; a user machine with a user application that logs to the host server to join a shared space session with other user machines running user applications, wherein the shared space session is generated by interaction of executable codes in the host and the user application and the shared space session is described by a session attribute list; a first memory for storing application code with a plurality of tools into one or more user computers; an input device for inputting multi type content including one or more of text documents, graphic images, video images, audio or data files into the shared space; a stage manager tool from the media application to stage and correlate a plurality of media-layers, and ordering the media-layers, according to spatial, temporal and relational coordinate data in the user application, wherein the media-layers data are described by a file descriptor inputting multi type content including one or more of text documents, graphic images, video images or data files into the shared space; and a display for displaying the content by computers in the shared space in one of a synchronous or asynchronous mode; a second memory for storing (a) collaborative procedural framework templates to create pages with specific layouts, (b) plug-ins for each type content for searching additional resource information, (c) converters for accessing through a browser the content of the procedural frameworks, each such procedural framework including:
  (1) a content process section that includes at least one item comprising (a) steps to be performed or (b) content materials;
  (2) a discussion point section that optionally includes one or more of a topic of discussion item corresponding to one item of the content process section;
  (3) an approval section that optionally includes one or more of an approval item corresponding to one item of the content process section; and
  (4) a hand-off section that optionally includes one or more of a hand-off item corresponding to one item of the content process section.

* * * * *